(12) United States Patent
Dasbach et al.

(10) Patent No.: US 12,514,982 B2
(45) Date of Patent: Jan. 6, 2026

(54) ASSEMBLY FOR A DRUG DELIVERY DEVICE AND DRUG DELIVERY DEVICE

(71) Applicant: Sanofi, Paris (FR)

(72) Inventors: Uwe Dasbach, Frankfurt am Main (DE); Thomas Mark Kemp, Melbourn Herts (GB); Timothy Denyer, Melbourn Herts (GB)

(73) Assignee: Sanofi, Paris (FR)

( * ) Notice: Subject to any disclaimer, the term of this patent is extended or adjusted under 35 U.S.C. 154(b) by 1087 days.

(21) Appl. No.: 17/611,821

(22) PCT Filed: May 27, 2020

(86) PCT No.: PCT/EP2020/064718
§ 371 (c)(1),
(2) Date: Nov. 16, 2021

(87) PCT Pub. No.: WO2020/239844
PCT Pub. Date: Dec. 3, 2020

(65) Prior Publication Data
US 2022/0241505 A1    Aug. 4, 2022

(30) Foreign Application Priority Data
May 29, 2019   (EP) .................................... 19305681

(51) Int. Cl.
*A61M 5/20*   (2006.01)
*A61M 5/31*   (2006.01)
*A61M 5/32*   (2006.01)

(52) U.S. Cl.
CPC ........ *A61M 5/2033* (2013.01); *A61M 5/3204* (2013.01); *A61M 2005/206* (2013.01);
(Continued)

(58) Field of Classification Search
CPC .............. A61M 5/3202; A61M 5/3204; A61M 5/3257; A61M 2005/312;
(Continued)

(56) References Cited

U.S. PATENT DOCUMENTS 8,708,970 B2 * 4/2014 Giambattista ....... A61M 5/3286
604/199
2010/0036320 A1   2/2010 Cox et al.
(Continued)

FOREIGN PATENT DOCUMENTS

CN   108697850 A   10/2018
EP   1715903 B1   10/2007
(Continued)

OTHER PUBLICATIONS

International Preliminary Report on Patentability in International Appln. No. PCT/EP2020/064718, dated Dec. 9, 2021, 8 pages.
(Continued)

*Primary Examiner* — Michael J Tsai
*Assistant Examiner* — Forrest Blake Dipert
(74) *Attorney, Agent, or Firm* — Fish & Richardson P.C.

(57) ABSTRACT

An assembly for a drug delivery device is provided, the assembly comprising: a housing for receiving a reservoir, and a cap releasable with respect to the housing, wherein the assembly has a capped state and an uncapped state, wherein the cap comprises a member to be gripped by a user for releasing the cap from the housing, wherein the member is rotatable to release the cap from the housing, wherein the assembly comprises an interface to convert rotational movement of the member into axial movement of the member, the interface comprising a track configured to guide movement of the member, wherein the track has a first region and a second region, wherein, when the first region guides the movement, the member is displaced from the housing by a
(Continued)

first distance, and when the second region guides the movement, the member is displaced from the housing by a second distance.

19 Claims, 12 Drawing Sheets

(52) U.S. Cl.
CPC . *A61M 2005/3109* (2013.01); *A61M 2205/58* (2013.01); *A61M 2205/8281* (2013.01)

(58) Field of Classification Search
CPC .. A61M 2005/3208; A61M 2005/3254; A61M 39/1055
See application file for complete search history.

(56) References Cited

U.S. PATENT DOCUMENTS

| | | |
|---|---|---|
| 2014/0371684 A1 | 12/2014 | Holmqvist |
| 2015/0051553 A1 | 2/2015 | Bjork et al. |
| 2016/0015957 A1* | 1/2016 | Tieck .................. A61M 5/1456 604/533 |
| 2017/0354790 A1 | 12/2017 | Atterbury et al. |
| 2018/0161512 A1 | 6/2018 | Wittland et al. |
| 2018/0311438 A1* | 11/2018 | Stamp ................. A61M 5/2033 |
| 2018/0318521 A1 | 11/2018 | Wendland et al. |
| 2018/0339105 A1 | 11/2018 | Schader et al. |
| 2018/0344944 A1 | 12/2018 | Wendland et al. |
| 2019/0001070 A1 | 1/2019 | Wendland et al. |

FOREIGN PATENT DOCUMENTS

| | | | |
|---|---|---|---|
| EP | 2255842 A1 | 12/2010 | |
| EP | 2873431 A1 | 5/2015 | |
| EP | 3106194 A1 | 12/2016 | |
| EP | 3351279 A1 | 7/2018 | |
| JP | 2018-535041 A | 11/2018 | |
| WO | WO 2008/148864 A1 | 12/2008 | |
| WO | WO-2010053569 A1 * | 5/2010 | ........ A61M 5/31551 |
| WO | WO 2013/085454 | 6/2013 | |
| WO | WO 2013/135566 | 9/2013 | |
| WO | WO 2017/089267 | 6/2017 | |
| WO | WO 2017/089284 | 6/2017 | |
| WO | WO-2017089259 A1 * | 6/2017 | .......... A61M 5/3202 |

OTHER PUBLICATIONS

International Search Report and Written Opinion in International Appln. No. PCT/EP2020/064718, dated Jun. 16, 2020, 9 pages.

* cited by examiner

ASSEMBLY FOR A DRUG DELIVERY DEVICE AND DRUG DELIVERY DEVICE

CROSS REFERENCE TO RELATED APPLICATIONS

The present application is the national stage entry of International Patent Application No. PCT/EP2020/064718, filed on May 27, 2020, and claims priority to Application No. EP 19305681.9, filed on May 29, 2019, the disclosures of which are incorporated herein by reference.

TECHNICAL FIELD

The present disclosure relates to an assembly, e.g., an assembly for a drug delivery device, with a removable cap. The present disclosure further relates to a drug delivery device comprising the assembly.

BACKGROUND

Drug delivery devices, such as auto-injectors, are known in the art for dispensing a medicament to the injection site of a patient. Such drug delivery devices typically comprise a housing unit and a cap. A needle syringe is located in a housing of the housing unit and is sometimes covered by a needle shield. The cap and needle shield are removable attached to the housing to shield the needle of the needle syringe. To dispense the medicament, the cap and needle shield are first removed from the housing to expose the needle. The needle is then inserted into the body of the patient at the injection site to inject the medicament. WO 2013/135566 A2 relates to a medicament delivery device, WO 2017/089267 A1 and WO 2013/085454 A1 each relate to an injection device, and WO 2017/089284 A1 relates to a medicament injection device.

The force required to remove the cap from the housing can be relatively high which can be due to the frictional interface between the needle shield and the syringe. Infirm patients such as the elderly or physically impaired may find removing the cap difficult due to the relatively high forces required. Furthermore the force required to remove the cap can be increased further by cold temperatures, some medicaments and therefore some drug delivery devices need to be stored in the fridge at low temperatures. This can exacerbate the difficulty in removing the cap from the housing.

SUMMARY

It is an aspect of the present invention to provide an improved assembly for a drug delivery device.

The present disclosure provides an assembly for a drug delivery device, the assembly comprising: a housing unit comprising a housing for receiving a drug reservoir, and a cap, wherein the cap is releasably securable with respect to the housing, wherein the assembly has at least two different states, i.e., a capped state, where the cap is secured with respect to the housing, and an uncapped state, where the cap is released from the housing, e.g., disconnected from the housing, wherein the cap comprises an outer member which is arranged to be gripped by a user for releasing, e.g., disconnecting, the cap from the housing, wherein the outer member is rotatable relative to the housing to release the cap from the housing, wherein the assembly comprises a mechanical interface which is configured to convert rotational movement of the outer member relative to the housing into axial movement of the outer member relative to the housing when switching from the capped state to the uncapped state, the mechanical interface comprising or being formed by at least one guide track which is configured to guide the movement of the outer member relative to the housing when the assembly is switched from the capped state to the uncapped state, wherein the guide track has at least a first sloped region and a second sloped region, wherein, when the assembly is switched from the capped state to the uncapped state, the first sloped region guides the movement of the outer member before the second sloped region guides the movement of the outer member, wherein the first sloped region and the second sloped region are adjusted to one another such that, when the first sloped region guides the movement and the outer member is rotated by an angle A, the outer member is displaced axially away from the housing by a first distance, and wherein, when the second sloped region guides the movement and the outer member is rotated by the angle A, the outer member is displaced axially away from the housing by a second distance, wherein the second distance is smaller than the first distance.

Due to the two differently sloped regions of the guide track, the proportion of force transferred from the user to the interior of the outer member or cap varies. In the second sloped region, on account of the smaller axial displacement, more force is available inside the outer member or the cap (e.g., to move an element in the interior of the housing unit together with the outer member) than in the first sloped region. Thus, the guide track can be adjusted to the needs during a cap removal process. In an initial phase, where the first sloped region guides the movement an internal force, e.g., a frictional force in the housing unit, counteracting the cap removal movement may be less than in the second sloped region. Thus, advantageously, the first sloped region may be steeper and/or require less space in the assembly. When a higher force is required, however, the slope may be reduced to increase the proportion of the user force which is transferred to the interior. Having sloped regions in a mechanical interface when removing the cap may provide a mechanical advantage as compared to a situation where the user tries to axially pull of the cap. During axial cap removal, high forces may have to be exerted; therefore having an improved transmission to reduce the force which the user has to generate to remove the cap is advantageous. The force which may have to be exerted while removing the cap by a pure axial pulling movement may be greater than or equal to one of the following values: 15N, 20N, 25N, 30N, 31N, 32N, 33N, 34N, 35N.

Surprisingly, it has been discovered when investigating the minimum force required to move a cap or outer member thereof is not the highest initially, but there may be an increasing force required during the movement. The presently proposed solution may tailor the mechanical interface to the specific application where an increased force may be transferred via the outer member after an initial movement has been performed already.

In an embodiment, a rotational movement of the outer member, e.g., about the longitudinal axis of the assembly or the housing, for traversing the entire first sloped region may define an angular extension $\alpha$ of the first region. In other words, the angular extension $\alpha$ may be the angular distance between the beginning and the end of the first sloped region.

In an embodiment a rotational movement of the outer member, e.g., about the longitudinal axis of the assembly or the housing, for traversing the entire second sloped region may define an angular extension $\beta$ of the second sloped region. In other words, the angular extension β may be the angular distance between the beginning and the end of the second sloped region.

In an embodiment, the angular extension α is smaller or greater than the angular extension β. Accordingly, the angular extensions may be different. As the force counteracting the removal of the cap may be initially smaller than later on, but a force maximum may occur close to the beginning, it may be expedient to have a first sloped region with an extension less than the second sloped region, wherein the force maximum, either a local or global maximum during the entire cap removal travel, expediently occurs while the second sloped region guides the movement of the outer member relative to the housing.

In an embodiment, the angle A may be less than or equal to the minimum of the angular extensions α, β (also termed Min(α, β)). Alternatively or additionally, the angle A may be greater than or equal to K*Min(α, β) where K is greater than or equal to one of the following values: 0.2, 0.3, 0.4, 0.5, 0.6, 0.7, 0.8, 0.9.

In an embodiment the angular extension α may be greater than or equal to 10°, 15°, or 20°.

In an embodiment the angular extension β may be greater than or equal to 20°, 25° or 30°.

In an embodiment the sum of the angular extensions α and β may be greater than or equal to 30°.

In an embodiment the sum of the angular extensions α and β may be less than or equal to one of the following values: 90°, 95°, 100°, 105°, 110°, 115°, 120°, 125°, 130°, 140°, 150°, 180°, 240°, 300°, 360°.

A restriction on the above-mentioned angular extensions results in limiting the required rotational movement to move and/or remove the outer member or the entire cap. Therefore, opening the device is faster and more user-friendly, where the force transfer from the user to the interior of the assembly via the outer member may be tailored to the particular needs as required by choosing the slopes of the regions of the guide track appropriately.

In an embodiment, the first sloped region may be steeper than the second sloped region. In other words, a slope in the first slope region may be greater than a slope in the second sloped region. The slope in the respective region may be constant in this case. In case of a varying slope, the minimum, maximum or average slope may be compared between the two sloped regions.

A steep (great) slope of the guide track is advantageous in regions where the force required to move the outer member is small, e.g., smaller than in other phases during the cap removal process. It is therefore possible to choose the slope of the guide track depending on the force required to remove the cap. Thus, the above-mentioned embodiment is advantageous in cases where the required force increases during the removal of the cap. Using steeper slopes in areas whose traverse requires little force is further advantageous because the steeper slope results in greater axial movement of the cap at a given angle of rotation. When the force required to move the outer member or keep the outer member moving increases, the slope can be reduced in the associated phase of the cap removal or detaching process Therefore, the cap may be removed faster and/or the space consumption of the guide track or the mechanical interface is comparatively small.

In an embodiment, a pure axial extension of the first sloped region may be smaller than a pure axial extension of the second sloped region, e.g., as seen along the rotation axis.

In an embodiment, a pure axial extension of the first sloped region may be greater than a pure axial extension of the second sloped region.

In an embodiment, a pure axial extension of the first sloped region may be equal to a pure axial extension of the second region.

In this context, the term "pure axial extension" may mean the length of the respective sloped region measured along the longitudinal axis of the assembly or the housing or the rotation axis.

In an embodiment, the slope of the guide track in the first sloped region and/or the second sloped region may be constant.

In an embodiment, a ramp angle defining the slope of the first sloped region may be greater than a ramp angle defining the slope of the second sloped region. The respective ramp angle may be measured relative to the rotation axis or the longitudinal axis of the housing or the assembly.

In an embodiment a ramp angle defining the slope of the first sloped region may be greater than or equal to 30° and/or less than or equal to 60°.

A ramp angle of more than 30° and less than 60° provides considerable axial displacement of the outer member and a sufficient transmission ratio while the outer member is traversing the first sloped region of the guide track. For example, a ramp angle of 40° for the first sloped region is advantageous. A steep first ramp angle provides the user with instant feedback, e.g., tactile and/or visual, that the outer member is being lifted, i.e., the cap removal process progresses as intended.

In an embodiment, a ramp angle defining the slope of the second region may be greater than or equal to 10° and/or less than or equal to 30°.

A ramp angle of more than 10° and less than 30° provides a sufficient axial displacement of the outer member and an optimized transmission ratio, to increase the proportion of the user force transferred, while the outer member is traversing the second sloped region of the guide track.

For example, a ramp angle of 25° for the second sloped region is advantageous. A maximum force which has to be exerted during the removal process to move the outer member or keep the outer member moving, may fall within the range of movement defined by the second sloped region during removal of the cap from the housing unit. It is therefore advantageous if the second sloped region has a smaller slope to obtain a larger gear ratio.

In an embodiment, the slope of the first sloped region and/or the second sloped region may vary.

The slope of the first sloped region and second sloped region does not have to be constant. If the slope varies within one of the regions, it can be that, in a first section closer to the start of the sloped region, the slope is smaller than in a subsequent section closer to the end of the sloped region.

In an embodiment, the first sloped region may be directly connected to the second sloped region.

The axial movement of the cap away from the housing is thus not interrupted during a rotational movement of the cap.

In an embodiment, the guide track may have third sloped region. When the assembly is switched from the capped state to the uncapped state, the third sloped region may guide the movement of the outer member after the second sloped region. The first sloped region, the second sloped region and the third sloped region may be adjusted to one another such that, when the third sloped region guides the movement and the outer member is rotated by the angle A, the outer member is displaced axially away from the housing by a third distance. The second distance may be smaller than the third distance. The first distance may be greater than, less than, or equal to the third distance.

The addition of a third sloped region further facilitates removal of the cap as the third sloped region may provide an increased transmission, after the maximum force(s) which have to be exerted for rotating the outer member have occurred already during the cap removal process. It should be noted that the guide track may also comprise more than three sloped regions. However, three sloped regions, where the intermediate region, here the second sloped region, is adjusted for an optimal force transfer from the outer member to the interior of the assembly may be advantageous nevertheless in terms of space consumption.

In an embodiment, a rotational movement of the outer member, e.g., about the longitudinal axis of the assembly or the housing, for traversing the entire third sloped region may define an angular extension $\gamma$ of the third region. The angular extension $\gamma$ may be greater than or less than the angular extension $\beta$ of the second sloped region. The angular extension $\gamma$ may be greater than or less than the angular extension $\alpha$ of the first sloped region.

Thus, the rotational movement to traverse the third sloped region may be less than the rotational movement required to traverse the second sloped region.

In an embodiment, the angle A may be less than or equal to the minimum of $\alpha$, $\beta$, and $\gamma$ (also termed Min($\alpha$, $\beta$, $\gamma$)). Alternatively or additionally, the angle A may be greater than or equal to K*Min($\alpha$, $\beta$, $\gamma$) where K is greater than or equal to one of the following values: 0.1, 0.2, 0.3, 0.4, 0.5, 0.6, 0.7, 0.8, 0.9.

In an embodiment, the angular extension $\gamma$ may be greater than or equal to 10°, e.g., greater than or equal to 15°.

In an embodiment, the sum of the angular extensions $\alpha$, $\beta$ and $\gamma$ may be greater than or equal to 40°.

In an embodiment, the sum of the angular extensions $\alpha$, $\beta$ and $\gamma$ may be less than or equal to one of the following values: 90°, 95°, 100°, 105°, 110°, 115°, 120°, 125°, 130°, 140°, 150°, 180°, 240°, 300°, 360°.

A restriction on the above-mentioned angular extensions results in limiting the required rotational movement to remove the cap. Therefore, opening the device is faster and more user-friendly.

In an embodiment, the third sloped region may be steeper than the second sloped region.

As mentioned above, a greater slope on the guide track is advantageous in regions where the force required to remove the cap is smaller, e.g., on account of the smaller space consumption or footprint required in the assembly. It is therefore possible to choose the slope of the guide track depending on the force required to move the outer member. Thus, the above-mentioned embodiment is advantageous in cases where the required force decreases after traversing the second sloped region. Using steeper slopes in areas which require comparatively little force to traverse is further advantageous because the steeper slope results in greater axial displacement of the outer member at a given rotation angle. Therefore, the cap is removed faster. Moreover, the user may have an experience similar to the one perceived while traversing the first sloped region, which increases the user's confidence that the cap removal process works as it should.

In an embodiment, the third sloped region may be as steep as the first sloped region. Accordingly, the first and third regions may have equal slopes.

This is advantageous if the force to be overcome during the traversing of the first and third sloped regions is lower, since for these areas a more pronounced axial displacement of the outer member is achieved for a given rotation angle.

In an embodiment, the pure axial extension of the third sloped region may be less than the pure axial extension of the second sloped region.

In an embodiment, the pure axial extension of the third sloped region may be greater than the pure axial extension of the second sloped region.

In an embodiment, the pure axial extension of the third sloped region may be equal to the pure axial extension of the second sloped region.

In an embodiment, the pure axial extension of the third sloped region may greater than the pure axial extension of the first sloped region.

As mentioned above, in this context, the term "pure axial extension" stands for the length of one of the sloped regions measured parallel along the longitudinal axis of the assembly. In other words, the pure axial extension is equal to the axial offset between the opposite ends of the region.

In an embodiment, the pure axial extension of the first sloped region may be in the range of 0.1 to 1 mm, the pure axial extension of the second sloped region may be in the range of 4 to 6 mm, and/or the pure axial extension of the third sloped region may be in the range of 0.5 to 2 mm.

In an embodiment, the pure axial extension of all of the sloped regions when taken together is greater than or equal to 5 mm and/or less than or equal to 8 mm.

This is advantageous because the axial distance to remove the cap is short, resulting in quick removal of the cap.

In an embodiment, the slope of the third sloped region may be constant.

In an embodiment, a ramp angle defining the slope of the third sloped region is greater than the ramp angle defining the slope of the second region.

In an embodiment, a ramp angle defining the slope of the third region may be greater than 30° and/or less than 60°.

A ramp angle of more than 30° and less than 60° provides considerable axial displacement of the outer member and a sufficient transmission ratio while the outer member is traversing the third sloped region of the guide track. For example, a ramp angle of 40° for the third sloped region is advantageous.

In an embodiment, the ramp angle of the third sloped region may be equal to the ramp angle of the first sloped region.

This is advantageous if the force to be overcome during the traversing of the first and third sloped regions is low, since for these areas a rapid axial feed of the cap is achieved.

In an embodiment, the slope of the third sloped region may vary.

The slope of the third sloped region does not have to be constant.

In an embodiment, the third sloped region may be directly connected to the second sloped region.

In an embodiment, the first sloped region may be directly connected to the second sloped region and the second sloped region may be directly connected to the third sloped region.

In an embodiment, the cap may comprise an inner member, e.g., a guard with a grabber. The housing unit may comprise a reservoir with a discharge opening, e.g., a needle. The reservoir may be a pre-filled syringe. A shield may be removably connected to the reservoir. The shield, when connected may cover the discharge opening of the reservoir, e.g., the tip of the needle. The inner member may be connected to the shield when the cap is connected to the housing, e.g., by a positive connection. The inner member may be removed together with the cap, when the cap is removed from the housing. The inner member may be connected to the shield such that the inner member removes the shield from the reservoir, when the cap is removed from the housing. The inner member bay be axially secured to the outer member. The outer member may be rotatable relative to the inner member. Thus, the axial force governing the axial displacement of the outer member relative to the housing may be transferred to the inner member and, via the inner member to the shield. By means of this arrangement, an improved shield removal mechanism may be provided.

In an embodiment a force required to move the shield in an axial direction relative to the reservoir, e.g., along the reservoir and/or away from the needle, may vary. The force may have a maximum which occurs while the shield is removed from the reservoir. The guide track may be configured such that the maximum falls within the range of movement defined by the second sloped region) during removal of the cap from the housing.

This is advantageous because the second sloped region can comprise the largest transmission ratio of guide track.

In an embodiment, the shield may comprise a rigid outer area and an elastic inner area, wherein the rigid outer area may face the inner member and the elastic inner area may face the discharge opening of the reservoir. The shield may be a so-called rigid needle shield (in short: RNS), which has a rigid outer shell and a deformable inner part which contacts the needle. The force to pull of the shield from the reservoir may be greater than 30 N.

While the rigid outer area allows a positive connection with the inner member, the elastic inner area enables a frictional and/or tight connection with the reservoir and/or the needle.

In an embodiment the interface may comprise or be formed by at least one interaction feature. The interaction feature, e.g., comprising a boss, may be in mechanical cooperation with the guide track. The interaction feature may be guided within the guide track, wherein as the outer member is rotated the interaction feature is forced to follow a path of the guide track along the sloped regions, the rotational movement being converted into axial movement of the outer member and preferably the inner member with respect to, e.g., away from, the housing.

In an embodiment, the guide track may be a groove or cut out. The interaction feature may be a boss.

In an embodiment, the guide track may be a ridge or projection and the interaction feature may be a boss or a notch.

In an embodiment, the mechanical interface may be established between the outer member and the housing, wherein the interaction feature may be located on the outer member and the guide track may be located on the housing.

In an embodiment, the mechanical interface may be established between the outer member and the housing, wherein the interaction feature may be located on the housing and the guide track may be located on the outer member.

In an embodiment, the cap may comprise an intermediate member, e.g., a collar. The mechanical interface may be established between the outer member and the intermediate member. The interaction feature may be located on the outer member and the guide track may be located on the intermediate member.

In an embodiment, the cap may comprise an intermediate member, e.g., a collar. The mechanical interface may be established between the outer member and the intermediate member. The interaction feature may be located on the intermediate member and the guide track may be located on the outer member.

In an embodiment, the cap may be connected to the housing via the intermediate member. The connection between the intermediate member and the housing may require a force to be released which is less than the maximum force required to move the shield axially. The force to release the connection between the intermediate member and the housing may be less than or equal to one of the following values: 5N, 4N, 3N, 2N, 1N.

In an embodiment, the cap, when connected to the housing, covers the distal end of the housing.

In an embodiment, the guide track may be arranged on a part of the cap.

In an embodiment, the assembly may be an auto-injector.

According to another aspect of the invention, a drug delivery device is provided, which comprises the assembly, e.g., as described further above. In addition to the assembly, the device may comprise a drug. The drug may be retained in a container, e.g., a syringe, comprising a needle, or a cartridge, or needle-free. The device may be an auto-injector as described further above.

A guide track using two, three or more differing sloped regions brings the following advantages: Saving space for regions where reduced force is required to lift the cap, increasing the mechanical advantage for regions where a high force is required to lift the cap, and providing instant feedback to the user at the beginning of the cap removal process that the cap is being lifted. For example, using three differing sloped regions gives an optimum cap removal process. However, using two sloped regions having different slopes is advantageous as well.

Consequently, the force required to remove the cap from the housing as well as the difficulty in removing the cap from the housing is lowered.

These and other aspects, advantages and expediencies will become apparent from the embodiments described hereinafter.

BRIEF DESCRIPTION OF THE FIGURES

Embodiments will now be described, by way of example only, with reference to the accompanying drawings, in which.

DETAILED DESCRIPTION

Figure 1A:
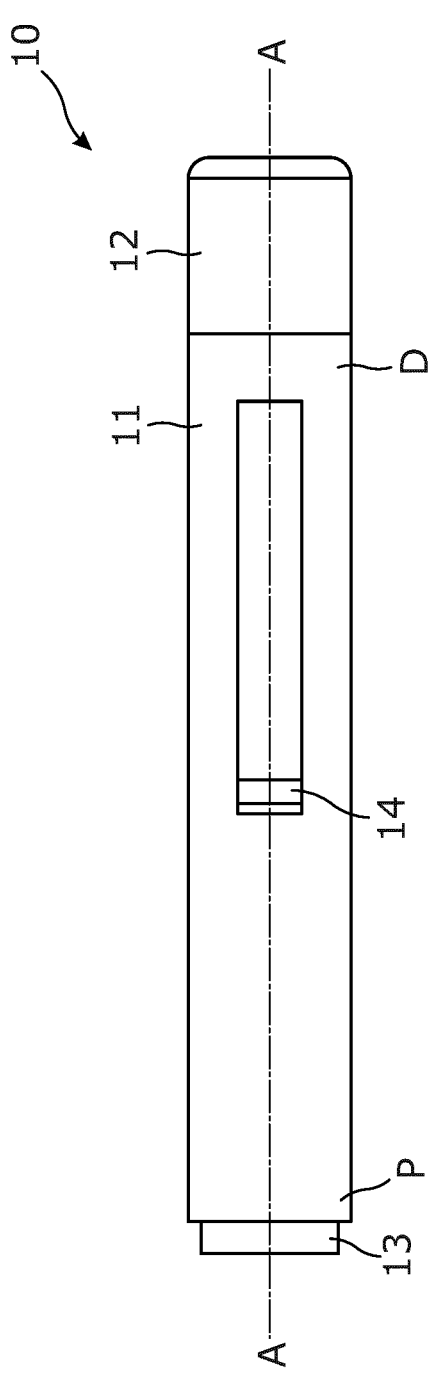
FIG. 1A is a schematic side view of an auto-injector with a cap attached to a housing of the auto-injector.

An assembly for a drug delivery device, as described herein, may be configured to inject a medicament into a patient. For example, delivery could be sub-cutaneous, intra-muscular, or intravenous. Such a device could be operated by a patient or care-giver, such as a nurse or physician, and can include various types of safety syringe, pen-injector, or auto-injector. The device can include a cartridge-based system that requires piercing a sealed ampule before use. Volumes of medicament delivered with these various devices can range from about 0.5 ml to about 2 ml. Yet another device can include a large volume device ("LVD") or patch pump, configured to adhere to a patient's skin for a period of time (e.g., about 5, 15, 30, 60, or 120 minutes) to deliver a "large" volume of medicament (typically about 2 ml to about 10 ml).

In combination with a specific medicament, the presently described devices may also be customized in order to operate within required specifications. For example, the device may be customized to inject a medicament within a certain time period (e.g., about 3 to about 20 seconds for auto-injectors, and about 10 minutes to about 60 minutes for an LVD). Other specifications can include a low or minimal level of discomfort, or to certain conditions related to human factors, shelf-life, expiry, biocompatibility, environmental considerations, etc. Such variations can arise due to various factors, such as, for example, a drug ranging in viscosity from about 3 cP to about 50 cP. Consequently, a drug delivery device will often include a hollow needle ranging from about 25 to about 31 Gauge in size. Common sizes are 27 and 29 Gauge.

The delivery devices described herein can also include one or more automated functions. For example, one or more of needle insertion, medicament injection, and needle retraction can be automated. Energy for one or more automation steps can be provided by one or more energy sources. Energy sources can include, for example, mechanical, pneumatic, chemical, or electrical energy. For example, mechanical energy sources can include springs, levers, elastomers, or other mechanical mechanisms to store or release energy. One or more energy sources can be combined into a single device. Devices can further include gears, valves, or other mechanisms to convert energy into movement of one or more components of a device.

The one or more automated functions of an auto-injector may each be activated via an activation mechanism. Such an activation mechanism can include one or more of a button, a lever, a needle sleeve, or other activation component. Activation of an automated function may be a one-step or multi-step process. That is, a user may need to activate one or more activation components in order to cause the automated function. For example, in a one-step process, a user may depress a needle sleeve against their body in order to cause injection of a medicament. Other devices may require a multi-step activation of an automated function. For example, a user may be required to depress a button and retract a needle shield in order to cause injection.

In addition, activation of one automated function may activate one or more subsequent automated functions, thereby forming an activation sequence. For example, activation of a first automated function may activate at least two of needle insertion, medicament injection, and needle retraction. Some devices may also require a specific sequence of steps to cause the one or more automated functions to occur. Other devices may operate with a sequence of independent steps.

Some delivery devices can include one or more functions of a safety syringe, pen-injector, or auto-injector. For example, a delivery device could include a mechanical energy source configured to automatically inject a medicament (as typically found in an auto-injector) and a dose setting mechanism (as typically found in a pen-injector).

Figure 1B:
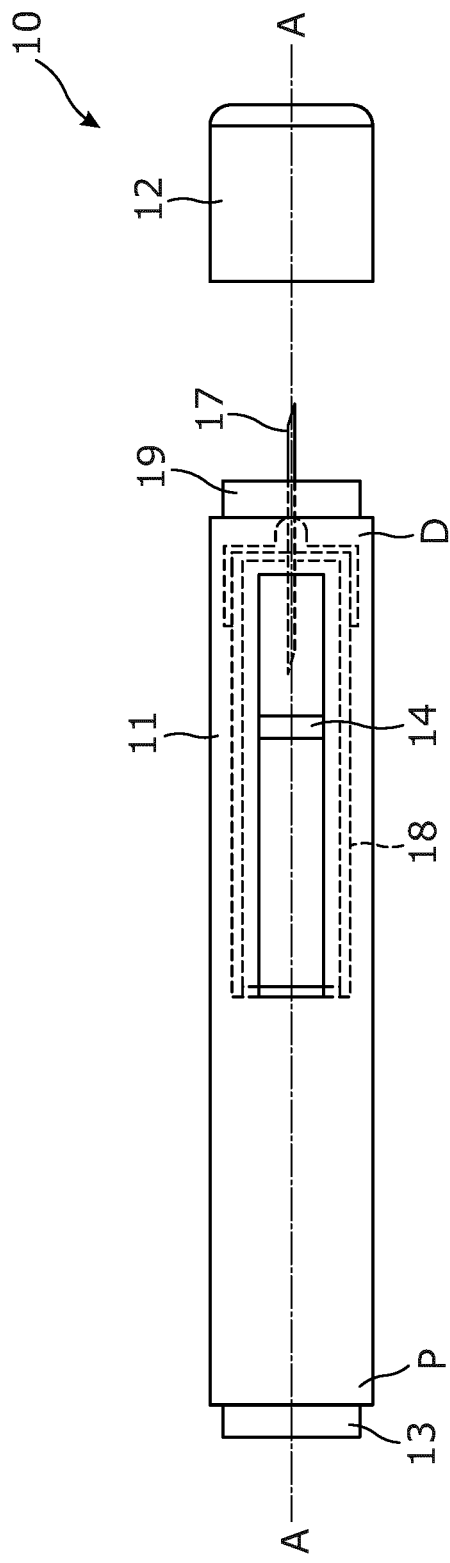
FIG. 1B is a schematic side view of the auto-injector of FIG. 1A, with the cap removed from the housing.

According to some embodiments of the present disclosure, an exemplary assembly of a drug delivery device 10 is shown in FIGS. 1A & 1B. Device 10, as described above, is configured to inject a medicament into a patient's body. Device 10 includes a housing 11 which typically contains a reservoir containing the medicament to be injected (e.g., a syringe) and the components required to facilitate one or more steps of the delivery process. Device 10 can also include a cap assembly or cap 12 that can be detachably mounted to the housing 11. Typically a user must remove cap 12 from housing 11 before device 10 can be operated.

As shown, housing 11 is substantially cylindrical and has a substantially constant diameter along the longitudinal axis A-A. The housing 11 has a distal region D and a proximal region P. The term "distal" refers to a location that is relatively closer to a site of injection, and the term "proximal" refers to a location that is relatively further away from the injection site.

Device 10 can also include a needle sleeve 19 coupled to housing 11 to permit movement of sleeve 19 relative to housing 11. For example, sleeve 19 can move in a longitudinal direction parallel to longitudinal axis A-A. Specifically, movement of sleeve 19 in a proximal direction can permit a needle 17 to extend from distal region D of housing 11.

Insertion of needle 17 can occur via several mechanisms. For example, needle 17 may be fixedly located relative to housing 11 and initially be located within an extended needle sleeve 19. Proximal movement of sleeve 19 by placing a distal end of sleeve 19 against a patient's body and moving housing 11 in a distal direction will uncover the distal end of needle 17. Such relative movement allows the distal end of needle 17 to extend into the patient's body. Such insertion is termed "manual" insertion as needle 17 is manually inserted via the patient's manual movement of housing 11 relative to sleeve 19.

Another form of insertion is "automated," whereby needle 17 moves relative to housing 11. Such insertion can be triggered by movement of sleeve 19 or by another form of activation, such as, for example, a button 13. As shown in FIGS. 1A & 1B, button 13 is located at a proximal end of housing 11. However, in other embodiments, button 13 could be located on a side of housing 11.

Other manual or automated features can include drug injection or needle retraction, or both. Injection is the process by which a bung or piston 14 is moved from a proximal location within a syringe 18 to a more distal location within the syringe 18 in order to force a medicament from the syringe 18 through needle 17. In some embodiments, a drive spring (not shown) is under compression before device 10 is activated. A proximal end of the drive spring can be fixed within proximal region P of housing 11, and a distal end of the drive spring can be configured to apply a compressive force to a proximal surface of piston 14. Following activation, at least part of the energy stored in the drive spring can be applied to the proximal surface of piston 14. This compressive force can act on piston 14 to move it in a distal direction. Such distal movement acts to compress the liquid medicament within the syringe 18, forcing it out of needle 17.

Following injection, needle 17 can be retracted within sleeve 19 or housing 11. Retraction can occur when sleeve 19 moves distally as a user removes device 10 from a patient's body. This can occur as needle 17 remains fixedly located relative to housing 11. Once a distal end of sleeve 19 has moved past a distal end of needle 17, and needle 17 is covered, sleeve 19 can be locked. Such locking can include locking any proximal movement of sleeve 19 relative to housing 11.

Another form of needle retraction can occur if needle 17 is moved relative to housing 11. Such movement can occur if the syringe 18 within housing 11 is moved in a proximal direction relative to housing 11. This proximal movement can be achieved by using a retraction spring (not shown), located in distal region D. A compressed retraction spring, when activated, can supply sufficient force to the syringe 18 to move it in a proximal direction. Following sufficient retraction, any relative movement between needle 17 and housing 11 can be locked with a locking mechanism. In addition, button 13 or other components of device 10 can be locked as required.

Figure 2:
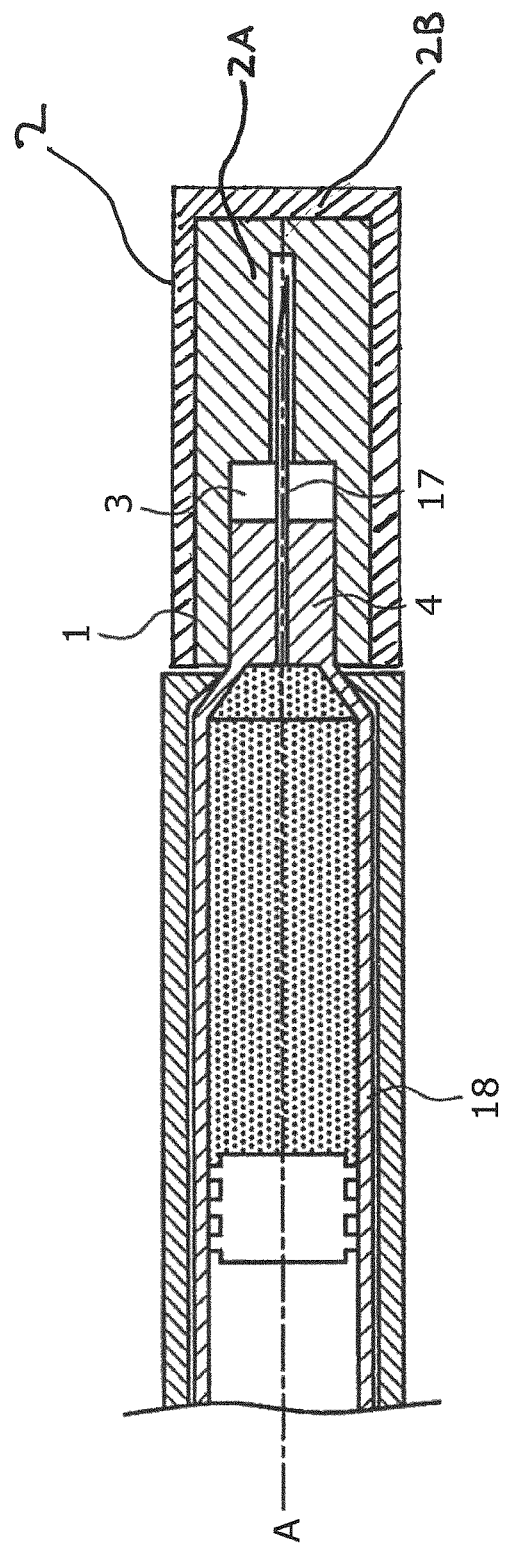
FIG. 2 is a close-up schematic cross-sectional side view of a needle shield of an auto-injector.

Referring now to FIG. 2, a drug delivery device 10 can further comprise a needle shield 1. The needle shield 1 is a so-called rigid needle shield (in short: RNS), which has a body 2. The body 2 is made of impermeable material with a recess 3 in the proximal end of the body 2. The recess 3 is configured to receive the needle hub 4 and the needle 17 such that the needle 17 is shielded by the body 2. The body 2 comprises a rigid outer shell 2B and a deformable inner part 2A. The deformable inner part of the body 2 and the outside surface of the needle hub 4 frictionally engage to seal the recess 3 to prevent the ingress of air into the recess 3. Thus, the needle 17 is kept sterile when the cap 12 is attached to the housing 11. The force to pull of the shield 1 from the reservoir is greater than 30 N.

It can be advantageous for the cap 12 and the needle shield 1 to be removed simultaneously which makes removal of the cap 12 and needle shield 1 easier for a user. The force required to remove the cap 12 from the drug delivery device 10 can be relatively high such that an elderly or physically impaired user may find removing the cap difficult. One reason this difficulty can arise is due to the frictional engagement between the needle shield 1 and the needle hub 4. However, it can be appreciated that the force required varies based on the materials of construction, the design of the device and the ambient temperature among other variables. Furthermore, the force required to remove the needle shield and the cap can be increased further by cold temperatures. For some medicaments and therefore some drug delivery devices, there is a requirement or need to store the device in the fridge or at low temperatures. This can exacerbate the difficulty in removing the cap 12 from the housing 11.

Figure 3:
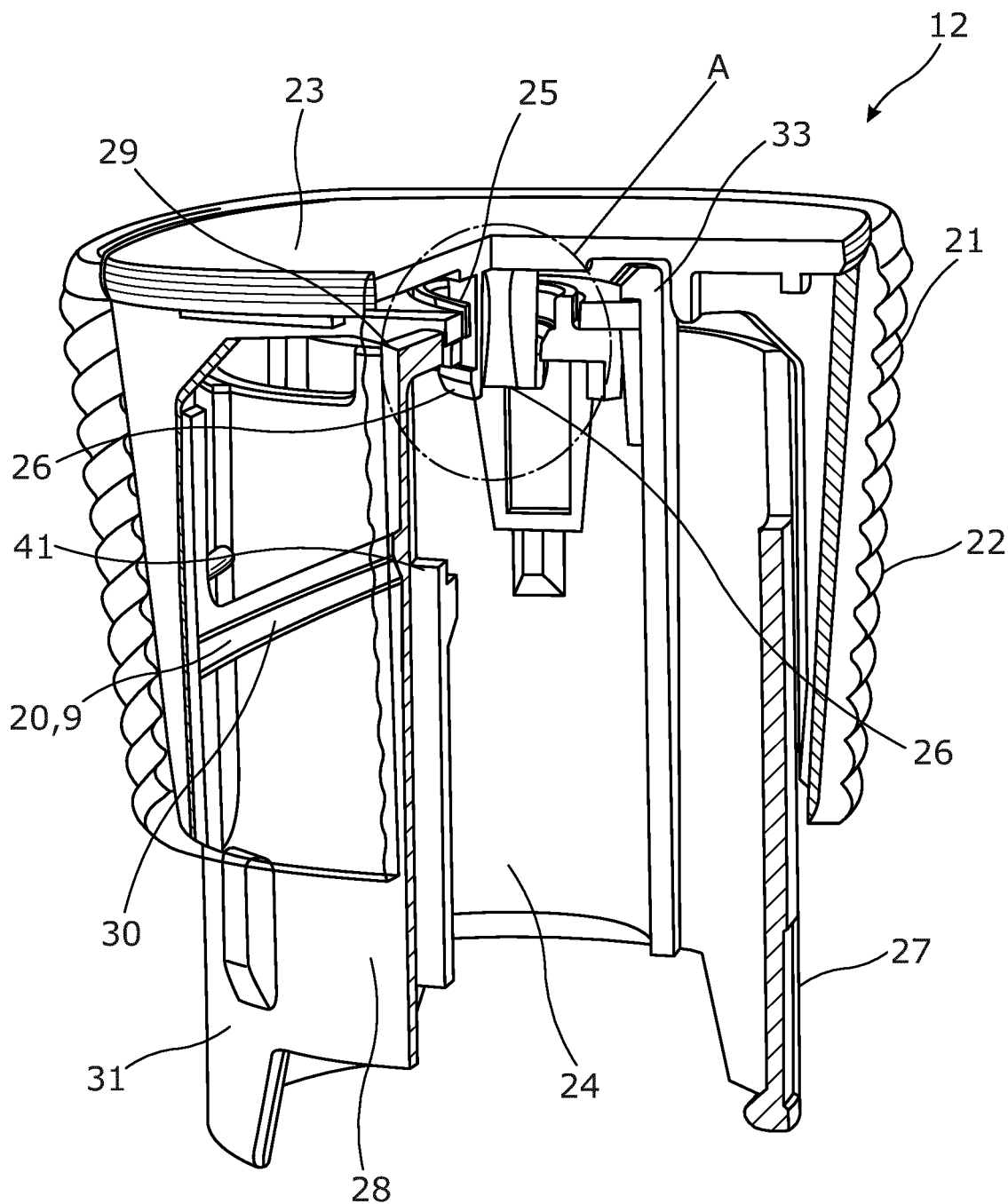
FIG. 3 is a close-up isometric view of a cap showing internal components of the cap.
Figure 4:
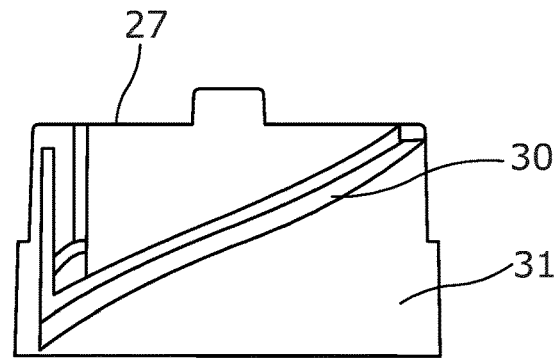
FIG. 4 is a close-up side view of a guide track of an intermediate member of FIG. 3.
Figure 5:
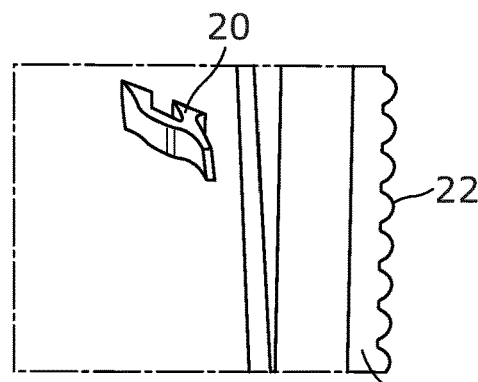
FIG. 5 is a close-up cross-sectional view of an outer member of FIG. 3 showing a lifting portion or interaction feature.
Figure 6:
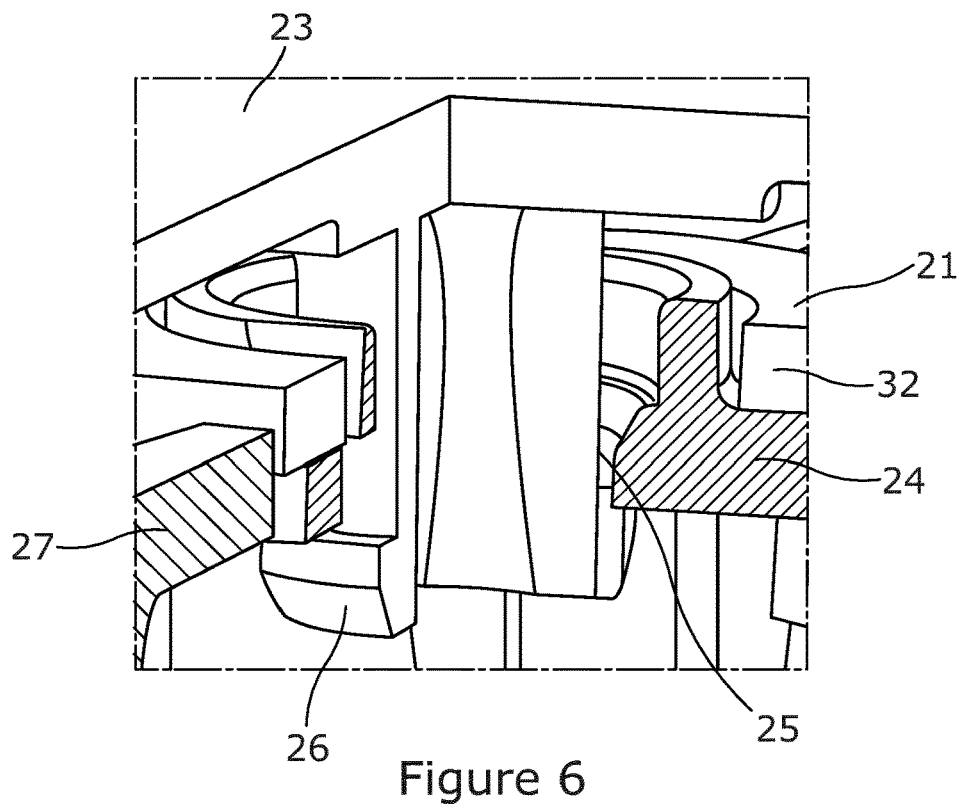
FIG. 6 is a close-up of section A of FIG. 3.
Figure 7:
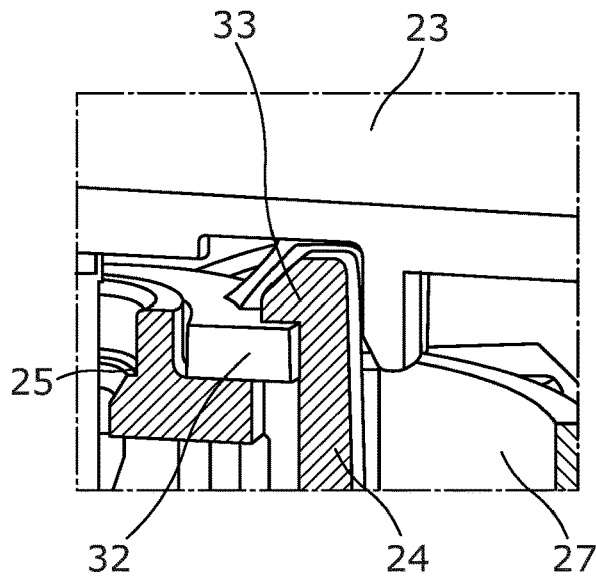
FIG. 7 is a close up view of an inner member clip of FIG. 3.
Figure 8:
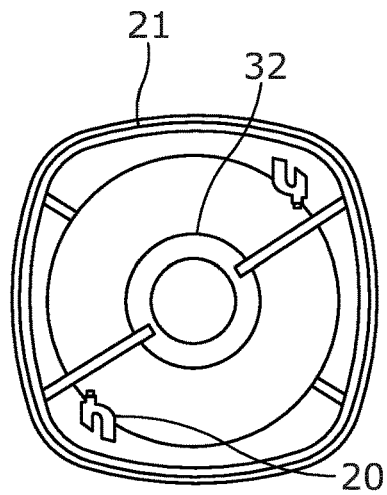
FIG. 8 is a plan view of the outer member of FIG. 3.
Figure 9:
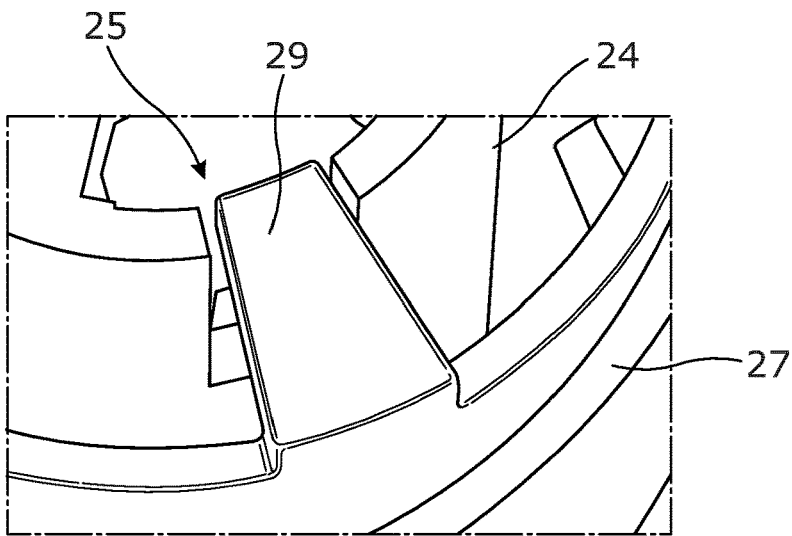
FIG. 9 is a close up isometric top view of the intermediate member and the inner member of FIG. 3.
Figure 10:
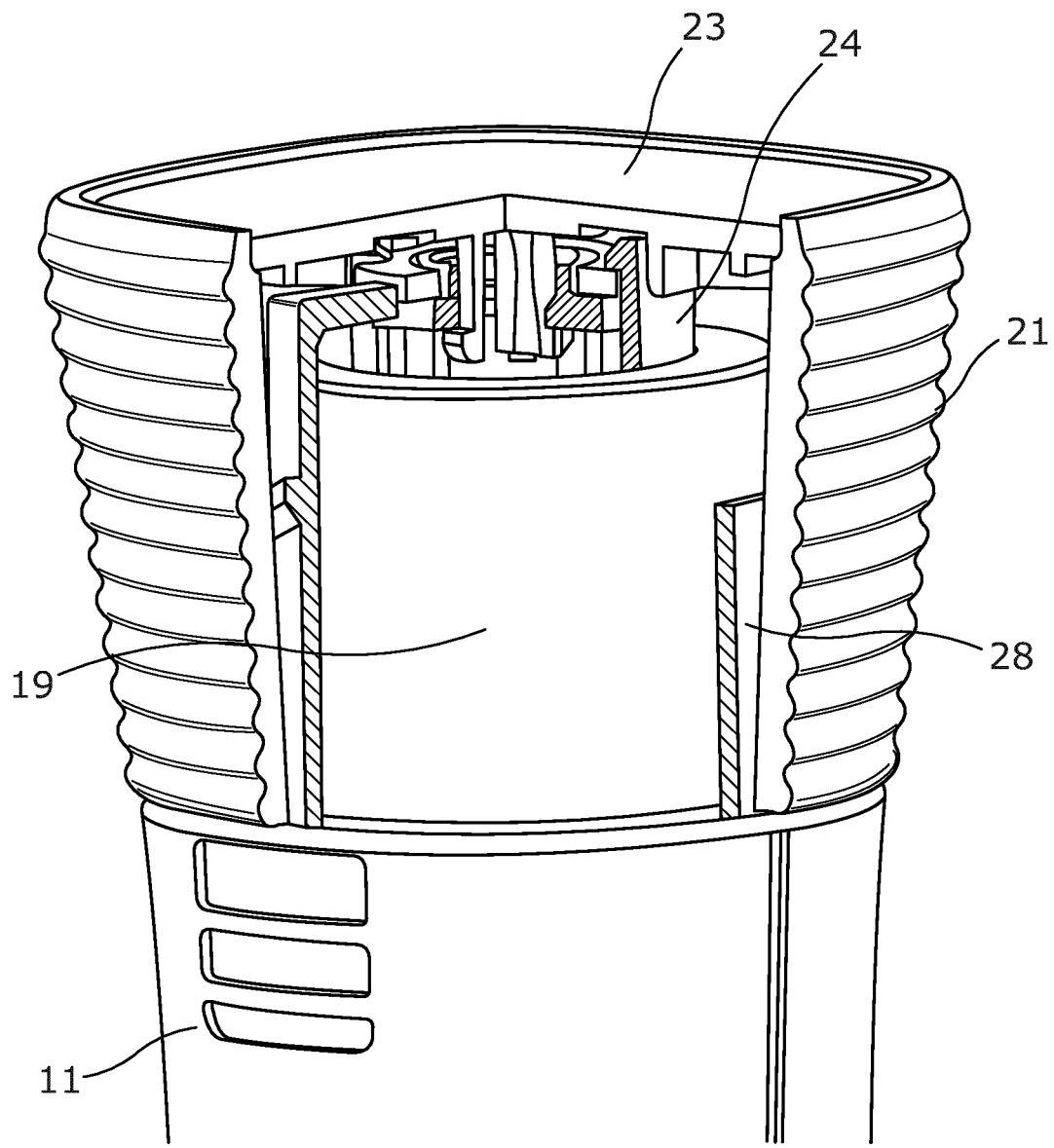
FIG. 10 is the cap of FIG. 3 before it has been removed on the auto-injector such as those in FIGS. 1A and 1B.
Figure 11:
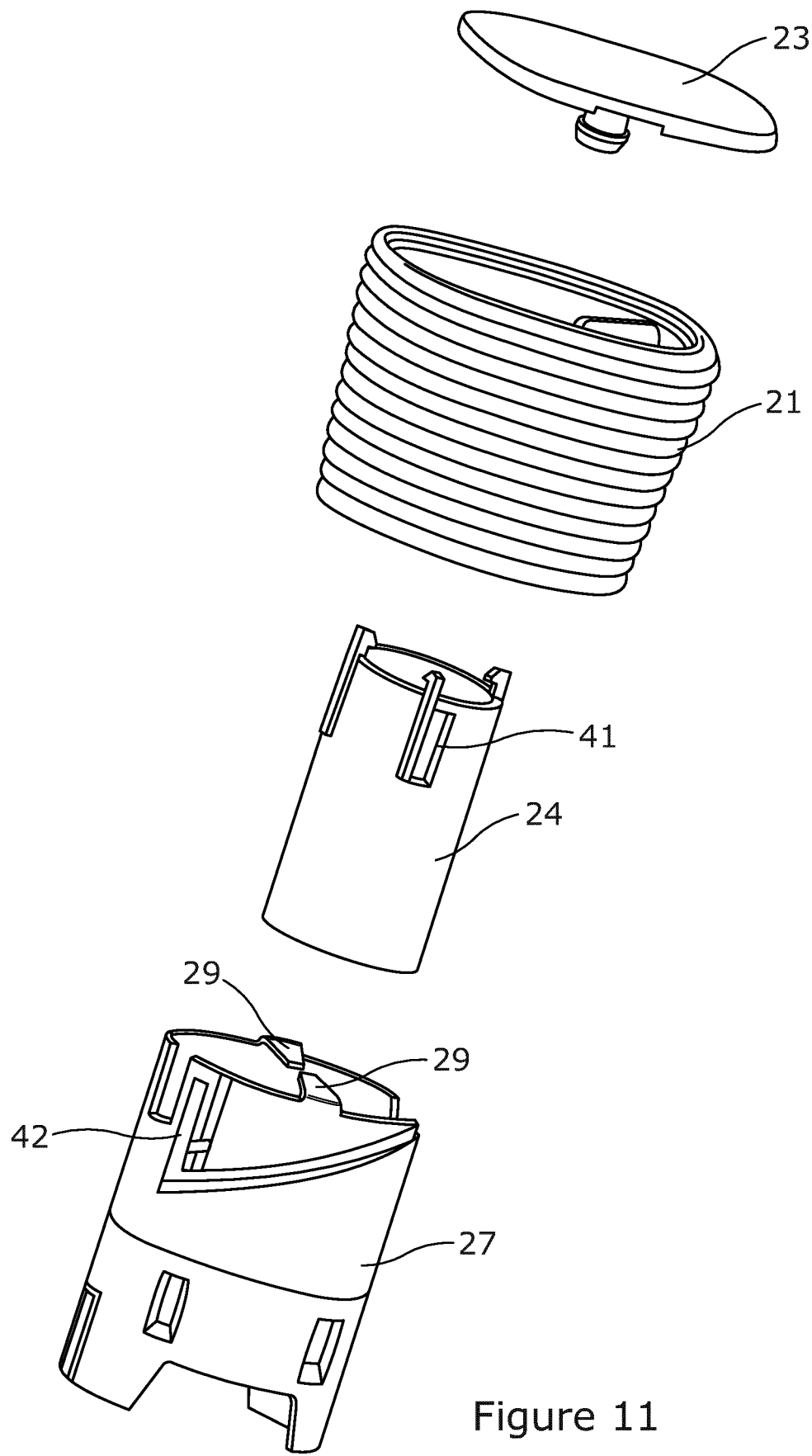
FIG. 11 is an exploded view of the main components of FIG. 3.

Illustrated in FIG. 3, there is a removable cap 12 having an outer member 21 with formations 22 to enhance the gripping characteristics of the outer member 21. It can be appreciated however that the outer member 21 may be made of a higher friction material, it may comprise a further coating, it may be specifically shaped ergonomically, or it may have no friction enhancing properties. The outer member 21 is coupled to a lid 23, the lid can be coupled to the outer member 21 by a press fit connection or alternative known connection means, the outer member 21 and the lid 23 can also be integrally formed so they are one component as they are fixed both axially and rotationally to one another. The outer member 21 comprises an interaction feature 20 which in this instance is an inwardly protruding boss 9. The outer member 21 further comprises an annulus 32.

The removable cap 12 has an inner member 24 with an aperture 25, the lid 23 has clips 26 which engage with the inner member 24 via the central aperture 25. This engagement axially couples the lid 23 to the inner member 24, however allows the lid 23 to rotate with respect to the inner member 24. The inner member 24 further comprises clips 33 which clip onto the annulus 32 of the outer member 21. This axially couples the outer member 21 and inner member 24 but allows them to rotate in relation to one another. The inner member 24 can interface or be configured to engage with the needle shield 1, this can be in the form of but not limited to, grippers, a barb cutting into or sitting tightly against the needle shield 1 or a frictional lock between the inner member 24 and the needle shield 1. The inner member 24 being configured to engage with the needle shield can mean that there is a separate component such as a grabber (not shown) attached or located within the inner member 24 which can further comprise any of the mechanisms described above.

The cap 12 also comprises an intermediate member 27 which is located substantially between the inner member 24 and the outer member 21. The intermediate member 27 has a substantially tubular body 28 with at least one inwardly projecting formation 29 at its distal end. The formation 29 is for engagement with a cut out 41 of the inner member 24, the inwardly projecting formation 29 and cut out 41 providing a stop mechanism. The inner member 24 is free to move axially in a distal direction away from the housing with respect to the intermediate member 27, until a first stop portion (i.e., the inwardly projecting formation 29) of the intermediate member 27 is engaged with a second stop portion (i.e., the proximal most extremity of cut out 41). When the first stop portion is engaged with the second stop portion the inner member 24 is fixed axially to the intermediate member 27. The stop mechanism also rotationally couples the intermediate member 27 to the inner member 24. An advantage of this feature is that the intermediate member 27 is not fixed axially to the inner member 24 until the stop portions are engaged. This enables the inner member 24 to move the needle shield 1 in a distal direction independently of the intermediate member 27 until the stop portions engage, the inner member 24 and intermediate member 27 are then fixed axially for the final lift of the cap 12 from the housing. It can be appreciated that the first stop portion could be a cut out, and the second stop portion could be a projection; furthermore the skilled person can envisage a number of alternative known means for the first and second stop portions which would provide a stopping mechanism as described above.

The intermediate member 27 also comprises the guide track 30 which is in the form of a ramped groove in an outer wall 31 of the intermediate member. The ramp can be an indent in the outer wall 31, or a cut out the entire way through the intermediate member 27. The ramp is inclined; however it can be appreciated that it can incline in either direction, it may also be a curved shape or comprise more than one gradient. The inclination of the ramp required is dependent on the direction of the rotational movement of the outer member 21 required to remove the cap 12. The intermediate member 27 is also fixed rotationally to the housing 11 which prevents the intermediate member 27 and therefore inner member 24 from rotational movement even when the outer member 21 is rotated or rotated.

It can be appreciated that there a number of ways which would be known to a person skilled in the art to rotationally and axially couple two components to one another. Any combination of grooves, clips, bosses, formations and protrusions can be used to couple each component described above allowing either rotational movement, axial movement or neither depending on the requirements described above. It can also be appreciated that the interaction feature 20 may be located on the intermediate member 27 and the guide track 30 may be located on the outer member 21. The first stop portion may be located on the inner member 24, the second stop portion located on the intermediate member 27. The stop portions can also be any known mechanism described above which allows relative axial movement to a point and then prevents relative axial movement past that point.

Figure 12:
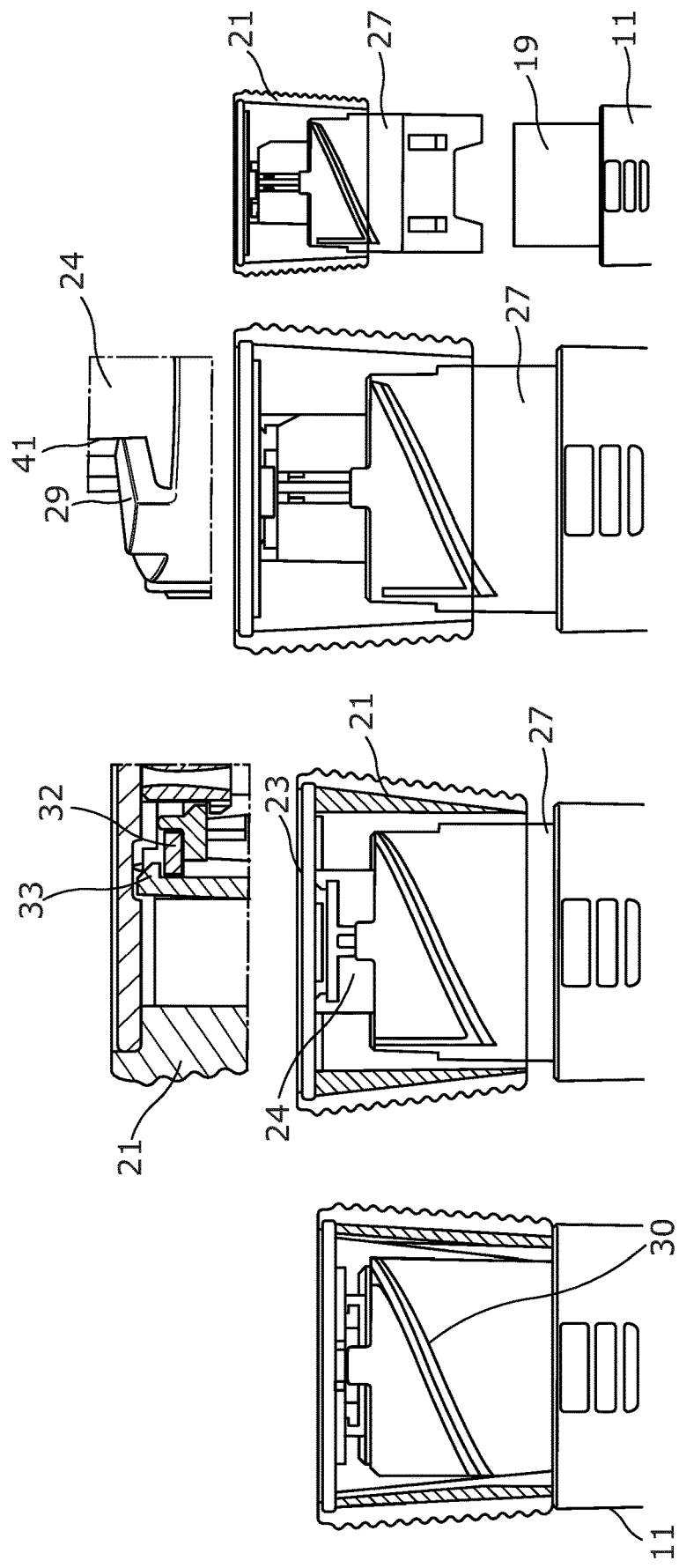
FIG. 12 is a side view showing the outer member as transparent so internal components can be viewed at various stages of removing the cap of FIG. 3.

The mechanism of removal of the cap 12 from the housing 11 can be described as follows and can be seen in the steps shown in FIG. 12. As a user twists or rotates the outer member 21, the force is transmitted from the outer member 21 to the inner member 24 through the clips 33. The inner member 24 is moved in a distal direction away from the housing 11. The interaction feature 20 travels along the guide track 30 from a first position to a second position, i.e., the inwardly protruding boss travels along the ramp as the outer member 21 is rotated. The first position being a proximal most end of the guide track and the second position being a distal most end of the guide track. At the end of the ramp, the intermediate member 27 and outer member 21 are fixed axially to one another, e.g., by the interaction feature 20 abutting an end stop on the intermediate member which delimits the guide track. The outer member 21 is then lifted, removing the cap with less force than would have been required before twisting of the outer member 21 and more smoothly due to the momentum buildup of the method described above. The drug delivery device 10 may further comprise a needle shield 1 and removal of the cap 12 removes the needle shield 1 simultaneously. The (maximum) force required to move the needle shield during the cap removal process may be high, e.g., greater than 20N, greater than 25N, or greater than 30N. This force may be required closer to the beginning of the cap removal process than the release of the connection between the cap and the housing. The force for releasing the connection of the cap to the housing, e.g., the one of the intermediate member and the housing, may be considerably smaller, e.g., less than or equal to one of the following values: 10N, 5N, 4N, 3N, 2N, 1N. Thus, after the needle shield has been moved or movement has been initiated, the force which has to be supplied by the user may be smaller than earlier during the cap removal process. Especially at the end of the process a rather small force has to be provided to detach the cap from the housing as has been described above already.

A method of assembling the cap 12 of the drug delivery device includes the following steps. The intermediate member 27 and the inner member 24 are held in position in the assembly equipment. The outer member 21 can then be clipped onto the inner member 24 forming a sub assembly. In some instances the intermediate member 27 incorporates a primary engagement portion which can be for example but not limited to, a thread, protrusion or a groove. The outer member 21 then comprises a secondary engagement portion which can be for example but not limited to a thread, protrusion, or a groove to suit the primary engagement portion. The outer member 21 is clipped onto the inner member 24 the secondary engagement portion of the outer member 21 also engages with the primary engagement portion of the intermediate member 27. The sub assembly is installed on a housing assembly, the housing assembly having previously been assembled and including the housing 11 and the needle shield 1 to cover the needle 17. The drug delivery device undergoes a priming action before the lid 23 is clipped onto the inner member 24 and engages via a press fit connection with the outer member 21.

Figure 13:
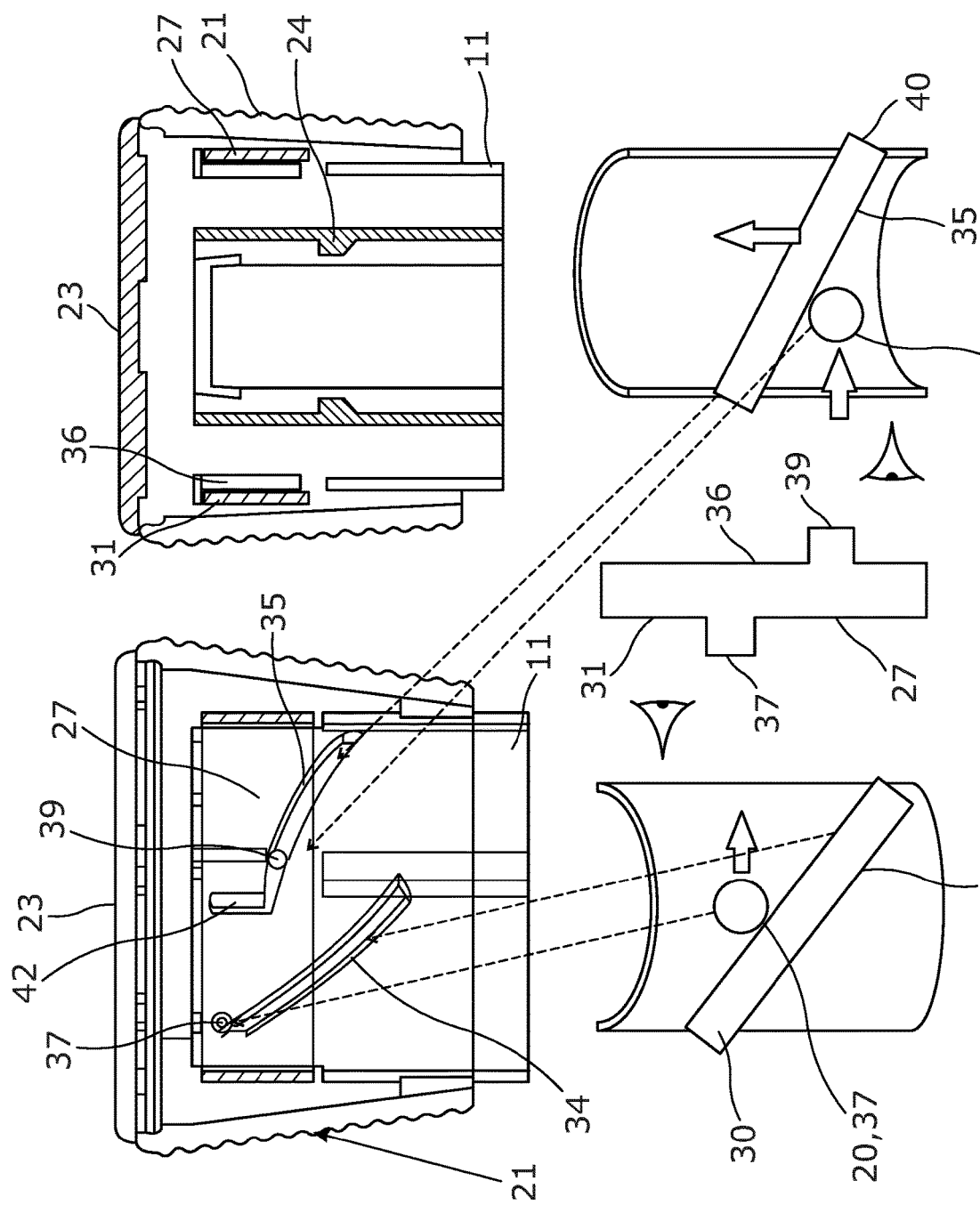
FIG. 13 is a diagrammatic view of a another cap.

Another aspect is shown in FIG. 13. A number of the features remain the same as in previous Figures and like components retain the same reference numerals. The intermediate member 27 has a first interaction feature 20 in the form of a primary protruding boss 37 and a second interaction feature 50 in the form of a secondary protruding boss 39. The outer member comprises a first guide track 30 in the form of a primary ramp 34 and the inner member comprises a second guide track 40 in the form of a secondary ramp 35. It can be appreciated that the ramps 34, 35 can be protruding from the inner or outer member, an indent or groove or a cut out the entire way through the inner or outer member. The ramp is inclined; however it can be appreciated that it can incline in either direction, curve, or comprise more than one gradient.

The primary protruding boss 37 is configured to engage with the primary ramp 34 from a first position to a second position, in the illustrated example from a distal most end of the ramp to a proximal most end of the ramp. The intermediate member 27 is fixed axially to the inner member 24 and not the outer member 21. As the outer member is pulled in a distal direction away from the housing, the intermediate member 27 resists the axial movement due to the engagement with the inner member 24. The intermediate member 27 is then forced to rotate due to the engagement of the primary ramp 34 and primary boss 37. As the outer member 21 is lifted and the intermediate member 27 rotates as described above, the secondary boss 39 is in engagement with the secondary ramp 35. The inner member is restricted from rotating with the intermediate member 27 as it is fixed rotationally to the housing 11 and therefore the engagement of the secondary boss 39 and the secondary ramp 35 causes the inner member to be forced up in a distal direction away from the housing 11. The cap 12 can then be removed from the housing.

When the first guide track 30 has a gradient shallower in an axial direction than the gradient of the second guide track 40, as shown in FIG. 13, then the axial movement of the outer member 21 from pulling in a distal direction is greater than the axial movement of the inner member. In this instance, the axial force on the inner member 24 is greater than the axial force applied to the outer member 21. It can be appreciated that this can be the opposite way round, and that the second guide track 40 could have a gradient shallower in an axial direction than the gradient of the first guide track. This would mean that as the outer member 21 is pulled from the housing 11 as described above, the axial movement of the outer member 21 causes an axial movement of the inner member which is greater than the axial movement of the outer member.

It can be appreciated that there a number of ways which would be known to a person skilled in the art to rotationally and axially couple two components to one another. Any combination of grooves, clips, bosses, formations and protrusions can be used to couple each component described above allowing either rotational movement, axial movement or neither depending on the requirements described above. It can also be appreciated that the lifting portions or interaction features 20, 50 may be located on the outer member and the inner member and the guide tracks 30, 40 may be located on the intermediate member 27 or any combination of the above. It can be considered that the outer member 21 and inner member 24 comprise the ramps and the intermediate member 27 comprises the protruding boss, one facing outwards towards the outer member and away from the central axis of the device, and another boss facing inwards towards the inner member and towards the central axis of the device, or any combination of the above which facilitates the mechanism described above.

The drug delivery device 10 may comprise a holding portion 42 at one end of the guide track 30 or the second guide track 40 to engage with the interaction feature 20 or second interaction feature 50 to resist relative movement of the cap 12 and the housing 11 before use. It may be required that the cap is pushed in a proximal direction to release the interaction feature from the holding portion 42 before removal of the cap. An advantage of this is that premature removal of the cap is prevented, this feature may also prevent movement of particular components of the device during storage or transport which could damage the device.

Figure 14:
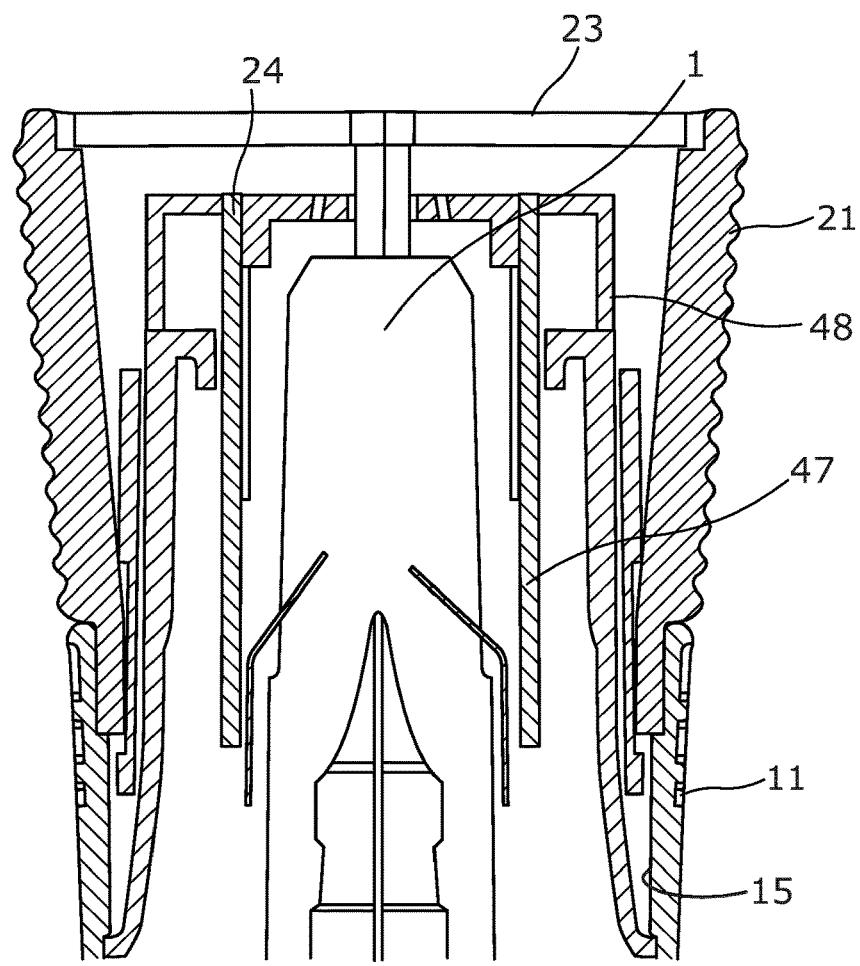
FIG. 14 is a cross-sectional side view of a yet another cap.
Figure 15:
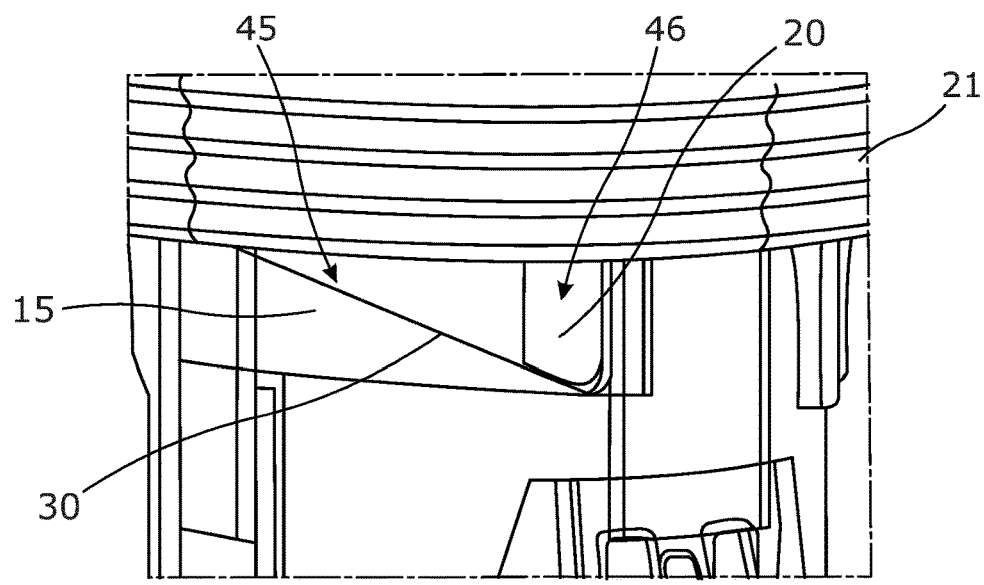
FIG. 15 is a close up view of the first interaction feature and the guide track of FIG. 14 with the housing showed as transparent so internal components can be seen.

Another aspect is shown in FIGS. 14 and 15, a number of the features remain the same as previous FIGS. and like components retain the same reference numerals. In this aspect an inner wall 15 of the housing 11 comprises the guide track 30, which in this aspect is an internal ramp 45. The interaction feature 20 being a proximally protruding boss 46, the boss 46 extends downwards from a proximal edge of the outer member 21 and in a proximal direction of the outer member 21. As the outer member is rotated the proximally protruding boss 46 engages with the internal ramp 45, lifting the outer member 21, the inner member 24 being fixed rotationally to the needle shield 1, but axially locked to the lid 23 and the outer member 21. Therefore the rotation of the outer member 21 and lid 23 allows the cap to be lifted and thus removed without rotation of the needle shield 1, needle sleeve or inner member 24. It can be appreciated that the inner member 24 can be made of two parts, an inner tube 47 and an outer tube 48. If coring, as described below, is not an issue then the inner tube 47 can be integral with or fixedly coupled to the outer member or lid. Furthermore it can be envisaged that the outer tube 48 may be rotatable with respect to the inner tube 47.

Figure 16:
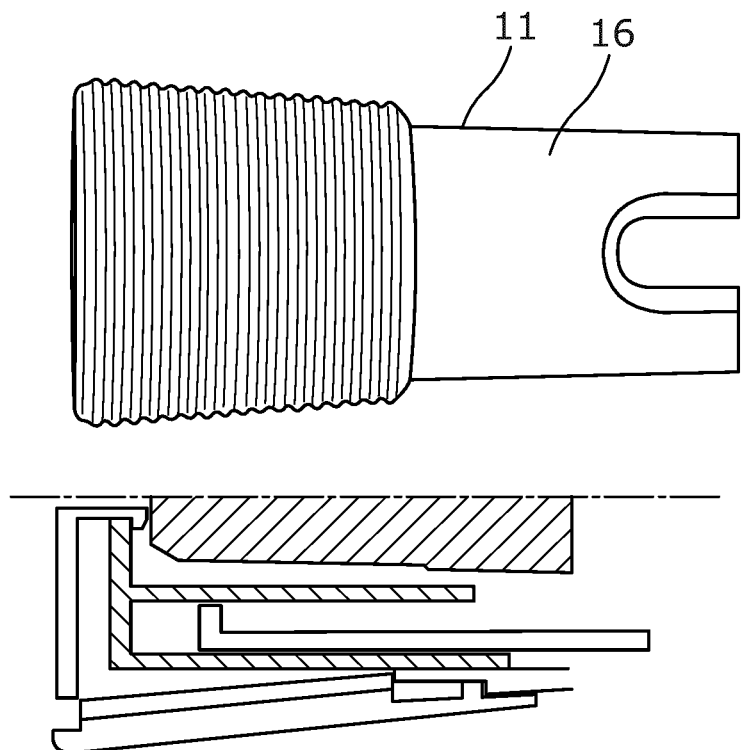
FIG. 16 is an alternative to FIG. 15 with the guide track on an external face of the housing where the guide track is visible both before and after uncapping.
Figure 17:
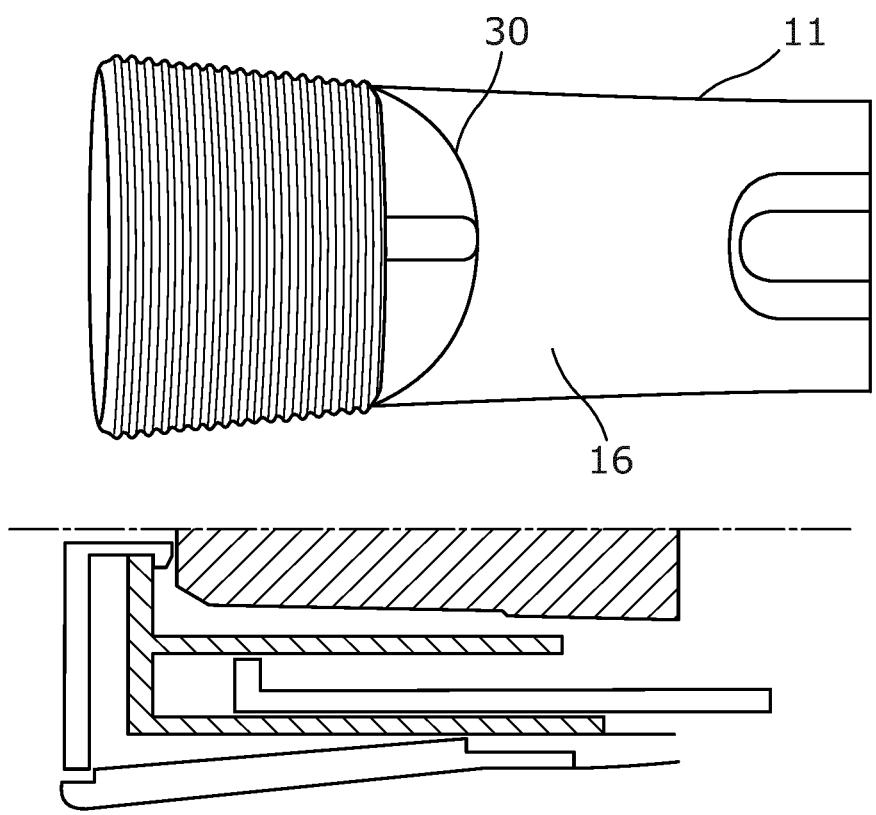
FIG. 17 is an alternative to FIG. 15 with the guide track on an external face of the housing where the guide track is not visible before uncapping.

It can be appreciated that the guide track 30 described above can be disposed on an external face 16 of the housing as shown in FIG. 17. This enables the guide track 30 to be visible both before and after uncapping (removing the cap from the drug delivery device). Furthermore the guide track 30 can be on the external face 16 of the housing however hidden by a longer length outer member 21 as in FIG. 16 extending further in a proximal direction than in other aspects. Wherein the guide track 30 is concealed before the cap is removed from the drug delivery device, however visible after the cap has been removed from the drug delivery device.

It can be appreciated that the guide track 30 is half-moon shaped, semicircular, linear with an incline in either direction, V-shaped, or an alternative ramped shape. Any shape can be envisaged that would suitably enable an interaction feature to engage with it and to cause an inner member to be lifted in a distal direction as described in any aspect above as the outer member 21 is rotated or lifted. The interaction feature may be a protrusion extending inwardly, outwardly, proximally or distally of the central axis of the housing depending on the corresponding guide track. The interaction feature and guide track may be disposed on an inner surface or outer surface of the housing or the outer member.

The interaction feature is a protrusion on the outer member extending axially in a proximal direction from a proximal edge of the outer member, the guide track being a recess or protrusion on the housing;

The interaction feature can be a protrusion on the housing extending axially in a distal direction from a distal edge of the housing, the guide track being a recess or protrusion on the outer member;

The interaction feature can be an inwardly protruding boss on an inner surface of the outer member, extending towards the central axis of the housing, the guide track being a recess or protrusion on the housing; and/or The interaction feature can be an outwardly protruding boss on an outer surface of the housing, extending away from the central axis of the housing, the guide track being a recess or protrusion on the outer member.

Furthermore, it can be appreciated that the interaction feature is on one of the housing 11 and the outer member 21 and the guide track is on the other of the housing 11 and the outer member 21.

The lifting mechanism described above enables an interface between the outer member 21 and housing 11 which is non-circular in shape, for example but not limited to oval, rounded square or triangular shaped. This is due to the fact that the outer member 21 is lifted from the housing 11 as the outer member 21 rotates relative to the housing 11. This leaves the only contact between the outer member 21 and the housing 11 being the lifting mechanism.

It can be appreciated that any gradient or guide track described in this specification could be also be non-constant. This would provide an advantage that the gearing the gradient provides can match the needle shield removal force which is also non-constant, i.e., in some embodiments as the cap is removed the force builds uniformly and then jumps to a peak. Therefore a variation in the gradients could provide gearing to provide low initial assistance to a user, followed by high assistance to a user to match the higher force required at the peak.

It can be appreciated that any interaction feature described in this specification can be for example but not limited to, a groove, clip, boss, formation, protrusion, cam, or follower. It can be appreciated that any guide track described in this specification can be for example but not limited to a protrusion, an indent or groove or a cut out. The guide track is inclined; however it can be appreciated that it can incline in either direction, curve, or comprise more than one gradient. The interaction feature must be able to engage with the guide track to actuate axial movement from rotation, or actuate rotation from an axial movement.

It can be appreciated that the inner member of any embodiment described in this specification can be integral to the outer member or formed of two parts, an inner tube 47 and an outer tube 48, the inner tube 47 being integral to the outer member 21, where coring is not an issue. Coring is the damage of a needle 17 by rotation of the needle shield 1. The end of the needle 17 cuts a small portion of an inner surface of the needle shield 1 away as the needle shield 1 rotates with respect to the needle 17. As the needle shield 1 is then removed from the syringe 18 the cut portion can remain in the needle 17 blocking the needle 17 and damaging the drug delivery device 10.

Figure 18:
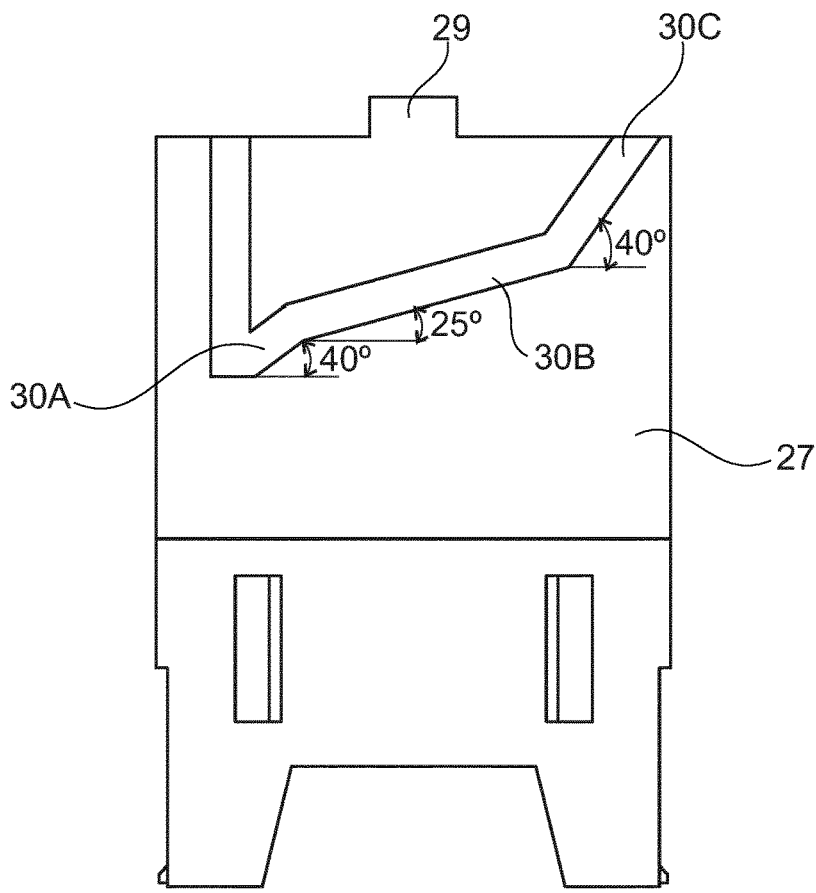
FIG. 18 is a schematic side view of an intermediate member.

An exemplary embodiment of the guide track 30 is shown in FIG. 18. A first sloped region 30A, a second sloped region 30B and a third sloped region 30C that form the guide track 30 are located on an outer surface of the intermediate member 27. In addition to the three sloped regions 30A, 30B and 30C, the intermediate member 27 has another alternative guide portion extending from a beginning of the first sloped region 30A parallel to the longitudinal axis of the intermediate member 27 to its distal end. The purpose of this alternative guide portion is to use an alternative opening track when removing the cap 12, which does not provide a mechanical advantage. The intermediate member 27 comprises the inwardly projecting formation 29 at its distal end, which ensures that the intermediate member 27 is disconnected from the housing 11 when removing the cap 12. It should be noted that the above mentioned alternative guide portion can also be omitted, as well as the third sloped region 30C. Apart from that, however, more than three sloped regions are possible. The first sloped region 30A, the second sloped region 30B and the third sloped region 30C together with the interaction feature 20 (not shown explicitly) establish a mechanical interface.

In some embodiments, the interaction feature 20 is provided on the outer member 21. However, it is also possible, that the interaction feature 20 is provided on the intermediate member 27 and the guide track 30 with its three sloped regions 30A, 30B and 30C is provided on the outer member 21.

Apart from that, the guide track 30 can also be attached to the housing 11, wherein the interaction feature can be attached to a part of the cap 12. As another alternative, the guide track 30 can be attached to a part of the cap 12, wherein the interaction feature 20 can be attached to the housing 11.

The interaction feature 20 is configured to interact with the first sloped region 30A, the second sloped region 30B and the third sloped region 30C, which is a groove or cut out or a ridge or projection, wherein the interaction feature 20 is a boss or a notch. The interaction feature 20 is located substantially within one of the sloped regions 30A, 30B and 30C, wherein as the outer member 21 is rotated the interaction feature 20 is forced to follow a path of the three sloped regions 30A, 30B and 30C, which results in an axial movement of the outer member 21, e.g., relative to housing 11 (not explicitly shown).

As shown, the first sloped region 30A is directly connected to the second sloped region 30B and the second sloped region 30B is directly connected to the third sloped region 30C. Thus, the axial lifting movement of the cap 12 is not interrupted during a rotational movement of the outer member 21.

The first sloped region 30A and the third sloped region 30C are steeper than the second sloped region 30B. In other words, the slopes in the first and third sloped regions 30A, 30C are greater than the slope in the second sloped region 30. The slope in the respective region may be constant in this case. In case of a varying slope, the minimum, maximum or average slope may be compared between the three sloped regions.

As shown in FIG. 18, the first sloped region 30A is as steep as the third sloped region 30C, i.e., the regions have the same slopes. However, it is also possible that the first sloped region 30A and the third sloped region 30C may be of different steepness.

In FIG. 18, the slopes of the first sloped region 30A, the second sloped region 30B, and the third sloped region 30C are constant. However these slopes do not have to be constant. The slope of the first sloped region 30A, the second sloped region 30B and/or the third sloped region 30C can vary. If the slope varies within one of the regions, for example, in a first section closer to the start of the first sloped region 30A, the slope can be smaller than in a subsequent section closer to the end of the first sloped region 30A.

In the shown example, each sloped region 30A, 30B and 30C comprises a ramp angle defining the slope. The ramp angles defining the first and third sloped region 30A and 30C are greater than the ramp angle defining the slope of the second sloped region 30B. In the example shown in FIG. 18, the ramp angle which defines the slope of the first and third region 30A, 30C is 40°, wherein the ramp angle which defines the slope of the second sloped region 30B is 25°.

However, other values are conceivable. For example the ramp angle defining the slope of the first and third region 30A and 30C may be greater than 30° and/or less than or equal to 60°, wherein the ramp angle defining the slope of the second region 30B may be greater than 10° and/or less than or equal to 30°.

The mode of action of the different sloped regions 30A, 30B, and 30C will be discussed below in relation to FIG. 19.

Figure 19:
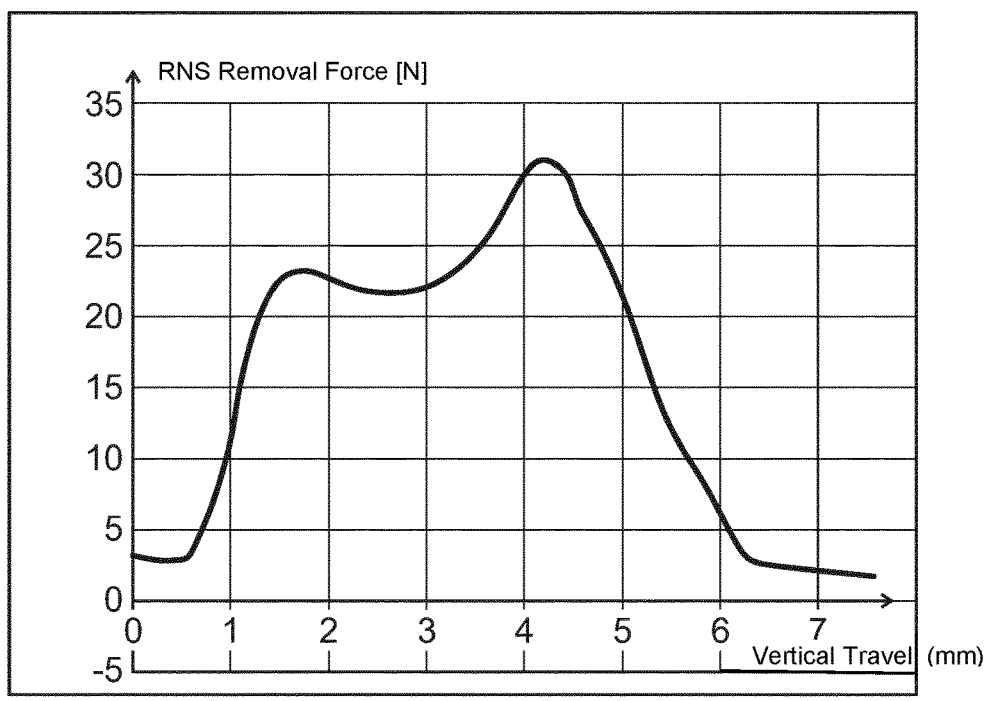
FIG. 19 is a force-displacement diagram showing the force required to remove the needle shield from a hub.

FIG. 19 shows a force-displacement diagram illustrating the force, which is required to move the needle shield 11, e.g., relative to or away from the hub 4 or the needle 17, during the axial travel of the needle shield away from the needle or the hub. Thus, this is the force which needs to act on the needle shield in the axial direction during its removal. This force has to be present at the interface needle shield/cap to remove the cap 12 with the needle shield 1 from the hub 4. The axial travel of the needle shield may correspond to the axial travel of the inner member, the outer member 21 or the entire cap, e.g., if the cap is unitary or all of the cap components move in unison axially during the cap/needle shield removal process, in the axial direction (the axial travel is denoted "Vertical travel" in the figure).

As mentioned above, the cap 12 comprises the inner member 24, e.g., a guard with a grabber, and the housing 11 comprises the hub 4 with a discharge opening, e.g., the needle 17, wherein the needle shield 1 is connected to the hub 4. The inner member 24 is connected to the needle shield 1. The inner member 24 is removed together with the cap 12, when the cap 12 is removed from the housing 11, wherein the inner member 24 is connected to the needle shield 1 such that the inner member 24 removes the needle shield 1 from the hub 4, when the cap 12 is removed from the housing 11.

The needle shield 1 comprises the body 2 with its rigid outer shell 2B and its deformable inner part 2A. The rigid outer shell 2B faces the inner member 24 and the deformable inner part 2A faces a discharge opening of the hub 4. While the rigid outer shell 2B allows a positive connection with the inner member 24, the deformable inner part 2A enables a frictional connection with the hub 4. The needle is arranged in the interior of the needle shield and may contact the deformable inner part 2A.

It has been discovered that the force required to move the needle shield 1 in an axial direction away from the hub 4 varies, likely due to the frictional connection of the deformable inner part 2A with the hub 4. Due to the rotational movement of the outer member 21 of the cap 12 which is converted into axial movement via the sloped regions of the guide track, the inner member 24 pulls the needle shield 1 in the axial direction, e.g., as it is axially secured to the outer member.

As shown in FIG. 19, at the beginning of the removal process, the force required for the axial movement of the needle shield 1, e.g., with a value of about 3 N and/or in the range between 0 and 0.8 mm, is relatively low. This may be because the needle shield 1 initially allows movement of the outer member 21 due to the elasticity or deformability of the deformable inner part 2A. The frictional connection of deformable inner part 2A and hub 4 may, however, still be established.

During the further axial movement of the outer member 21, e.g., after about 0.8 mm, the maximum expansion limit of the deformable inner part 2A may have been reached, so that for a further axial movement of the outer member 21, the frictional connection between the deformable inner part 2A and the hub 4 has to be released. For this purpose, an enormous increase in the force is required, which is shown in FIG. 19, e.g., in the range of 0.8 to about 5.8 mm. Although the maximum force does not reach 35N in this particular measurement, forces up to 35N are sometimes required to remove the needle shield.

After the frictional connection is released, the force required drops drastically, so that only a small force of approximately 2 to 5 N for the axial movement of the outer member 21 during the remaining removal process remains in the last range of about 5.8-7.5 mm.

To reduce the effort of a user removing the cap 12, the slope of the regions is selected to increase the gear ratio or mechanical advantage as the force required to remove needle shield 1 increases. This is made possible by a flattening the slope of the guide track 30 in the relevant region.

In the example shown, therefore, the region has the flattest slope on which the interaction feature 20 moves when the required force is greatest. In the present example, the guide track 30 is configured such that the force maximum falls within the range of movement defined by the second sloped region 30B during removal of the cap 12 from the housing unit 11. The second sloped region may guide the movement while a plurality of local maxima of the force-travel curve, e.g., including its global maximum, occur.

In the illustrated embodiment, traversing the first sloped region 30A takes place when the outer member 21 is moved between 0-0.8 mm, traversing the second sloped region 30B when the outer member 21 is moved between 0.8-5.8 mm and traversing the third sloped region 30C, when the outer member 21 is moved between 5.8-7.5 mm in the axial direction.

In the embodiment shown in FIG. 19, the adaptation of the slope to the required force is as follows:

| Force required | Ramp angle |
|---|---|
| ~3 N | 40° |
| 12-33 N (maybe even up to 35 N) | 25° |
| 0-5 N | 40° |

A rotational movement of the outer member 21 about the longitudinal axis of the assembly for traversing the entire first sloped region 30A defines an angular extension $\alpha$. In other words, the angular extension $\alpha$ is the angular distance between the beginning and the end of the first sloped region 30A. When the outer member 21 is rotated by $\alpha$, the outer member 21 is axially displaced by approximately 0.8 mm.

A rotational movement of the outer member 21 about the longitudinal axis of the assembly for traversing the entire second sloped region 30B defines an angular extension $\alpha$. In other words, the angular extension $\alpha$ is the angular distance between the beginning and the end of the second sloped region 30B. When the outer member 21 is rotated by $\alpha$, the outer member 21 is axially displaced by approximately 5 mm. Together with the first shift thus a distance of approximately 5.8 mm is covered.

A rotational movement of the outer member 21 about the longitudinal axis of the assembly for traversing the entire third sloped region 30C defines an angular extension $\gamma$. In other words, the angular extension $\gamma$ is the angular distance between the beginning and the end of the third sloped region 30C. When the outer member 21 is rotated by $\gamma$, the outer member 21 is axially displaced by approximately 1.7 mm. Together with the first and the second shift a distance of approximately 7.5 mm is covered in this way.

The angular extensions $\alpha$ and $\gamma$ are smaller than the angular extension $\beta$. Thus, the rotational movement of the outer member 21 that the user must make to traverse the first sloped region 30A or the third sloped region 30C is less than the rotational movement for traversing the second sloped region 30B.

Each angular extension $\alpha$ and $\gamma$ is greater than or equal to 10°, wherein the angular extension $\beta$ is greater than or equal to 20°. Therefore the sum of the angular extensions $\alpha$, $\beta$ and $\gamma$ is greater than 40°. The sum of the angular extension $\alpha$, $\beta$ and $\gamma$ may be smaller than 90° or equal to 90°. This has proven to be particularly comfortable for the user as he has to rotate only by up to one quarter of one entire revolution. However, the sum of the angular extensions $\alpha$, $\beta$ and $\gamma$ may alternatively be greater than 90°, e.g. less than or equal to one of the following values: 95°, 100°, 105°, 110°, 115°, 120°, 125°, 130°, 140°, 150°, 180°, 240°, 300°, 360°.

A pure axial extension of the first sloped region 30A is in the range of approximately 0.1 to 1 mm, the pure axial extension of the second sloped region 30B is in the range of approximately 4 to 6 mm, and the pure axial extension of the third sloped region 30C is in the range of 0.5 to 2 mm. The pure axial extension of all of the sloped regions when taken together is greater than or equal to 5 mm and/or less than or equal to 8 mm. It should be appreciated that these values could vary especially depending on the needle shields which are applied. The pure axial extensions may be adjusted to the requirements for a particular needle shield and the forces which have to be transferred.

In the context above, the term "pure axial extension" stands for the extension of one of the sloped regions 30A, 30B, and 30C measured parallel along the longitudinal axis of the assembly. In other words, the pure axial extension is equal to the axial offset between the opposite ends of the region.

The drug delivery device 1 may be disposable or it may be reusable.

The drug delivery device 1 may provide a fixed dose or a user-settable dose.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C, CM-3, GLP-1 Eligen, ORMD-0901, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, TT-401, BHM-034. MOD-6030, CAM-2036, DA-15864, ARI-2651, ARI-2255, Exenatide-XTEN and Glucagon-Xten.

An example of an oligonucleotide is, for example: mipomersen sodium (Kynamro®), a cholesterol-reducing antisense therapeutic for the treatment of familial hypercholesterolemia.

Examples of DPP4 inhibitors are Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

The invention claimed is:

1. An assembly for a drug delivery device, the assembly comprising:
   a housing unit comprising a housing for receiving a drug reservoir, and
   a cap releasably securable with respect to the housing,
   wherein the assembly has a capped state in which the cap is secured with respect to the housing, and an uncapped state in which the cap is released from the housing,
   wherein the cap comprises an outer member arranged to be gripped by a user for releasing the cap from the housing,
   wherein the outer member is rotatable relative to the housing to release the cap from the housing,
   wherein the assembly comprises a mechanical interface which is configured to convert rotational movement of the outer member relative to the housing into axial movement of the outer member relative to the housing when switching from the capped state to the uncapped state,
   wherein the mechanical interface comprises at least one guide track configured to guide the movement of the outer member relative to the housing when the assembly is switched from the capped state to the uncapped state,
   wherein the guide track has at least a first sloped region and a second sloped region,
   wherein, when the assembly is switched from the capped state to the uncapped state, the first sloped region guides the movement of the outer member before the second sloped region guides the movement of the outer member,
   wherein the first sloped region and the second sloped region are configured such that, when the first sloped region guides the movement and the outer member is rotated by an angle, the outer member is displaced axially away from the housing by a first distance, wherein, when the second sloped region guides the movement and the outer member is rotated by the angle, the outer member is displaced axially away from the housing by a second distance, wherein the second distance is smaller than the first distance, and wherein the mechanical interface comprises at least one interaction feature in mechanical cooperation with the guide track, wherein the rotational movement of the outer member for traversing the entire first sloped region defines a first angular extension, wherein a rotational movement of the outer member for traversing the entire second sloped region defines a second angular extension, and wherein the first angular extension is smaller than the second angular extension.

2. The assembly according to claim 1, wherein the angle is less than or equal to the first angular extension.

3. The assembly according to claim 1, wherein the angle is greater than or equal to half of the first angular extension.

4. The assembly according to claim 1, wherein the guide track has a third sloped region, wherein, when the assembly is switched from the capped state to the uncapped state, the third sloped region guides the movement of the outer member after the second sloped region, wherein the first sloped region, the second sloped region and the third sloped region are configured such that, when the third sloped region guides the movement and the outer member is rotated by the angle, the outer member is displaced axially away from the housing by a third distance, and wherein the second distance is smaller than the third distance.

5. The assembly according to claim 4, wherein a rotational movement of the outer member for traversing the entire third sloped region defines a third angular extension, wherein the third angular extension is smaller than the second angular extension and/or greater than the first angular extension.

6. The assembly according to claim 4, wherein the third sloped region is steeper than the second sloped region.

7. The assembly according to claim 1, wherein the first sloped region is steeper than the second sloped region.

8. The assembly according to claim 1, wherein a slope of the guide track in the second sloped region is constant.

9. The assembly according to claim 1, wherein a slope of the guide track in the first sloped region is constant.

10. The assembly according to claim 1, wherein the cap comprises an inner member and the housing unit comprises a reservoir with a discharge opening, wherein a shield is removably connected to the reservoir, wherein the inner member is connected to the shield when the cap is connected to the housing such that the inner member removes the shield from the reservoir when the cap is removed from the housing.

11. The assembly according to claim 10, wherein a force required to move the shield in an axial direction relative to the reservoir varies during the removal of the shield from the reservoir, the force having a maximum which occurs while the shield is removed from the reservoir, and wherein the guide track is configured such that the maximum falls within a range of movement defined by the second sloped region during removal of the cap from the housing.

12. The assembly according to claim 10, wherein the shield comprises a rigid outer area and an elastic inner area, wherein the rigid outer area faces the inner member and the elastic inner area faces the discharge opening of the reservoir.

13. The assembly according to claim 1, wherein the guide track is arranged on a part of the cap.

14. The assembly according to claim 1, wherein the assembly is an auto-injector.

15. A drug delivery device comprising:
an assembly comprising:
a housing unit comprising a housing for receiving a drug reservoir, and
a cap releasably securable with respect to the housing,
wherein the assembly has a capped state in which the cap is secured with respect to the housing, and an uncapped state in which the cap is released from the housing,
wherein the cap comprises an outer member arranged to be gripped by a user for releasing the cap from the housing,
wherein the outer member is rotatable relative to the housing to release the cap from the housing,
wherein the assembly comprises a mechanical interface which is configured to convert rotational movement of the outer member relative to the housing into axial movement of the outer member relative to the housing when switching from the capped state to the uncapped state,
wherein the mechanical interface comprises at least one guide track configured to guide the movement of the outer member relative to the housing when the assembly is switched from the capped state to the uncapped state,
wherein the guide track has at least a first sloped region and a second sloped region,
wherein, when the assembly is switched from the capped state to the uncapped state, the first sloped region guides the movement of the outer member before the second sloped region guides the movement of the outer member,
wherein the first sloped region and the second sloped region are configured such that, when the first sloped region guides the movement and the outer member is rotated by an angle, the outer member is displaced axially away from the housing by a first distance,
wherein, when the second sloped region guides the movement and the outer member is rotated by the angle, the outer member is displaced axially away from the housing by a second distance,
wherein the second distance is smaller than the first distance, and
wherein the mechanical interface comprises at least one interaction feature in mechanical cooperation with the guide track,
wherein a rotational movement of the outer member for traversing the entire first sloped region defines a first angular extension,
wherein a rotational movement of the outer member for traversing the entire second sloped region defines a second angular extension, and
wherein the first angular extension is smaller than the second angular extension, and
a drug.

16. The drug delivery device according to claim 15, wherein the angle is less than or equal to the first angular extension.

17. The drug delivery device according to claim 15, wherein the angle is greater than or equal to half of the first angular extension.

18. The drug delivery device according to claim 15, wherein the guide track has a third sloped region,
- wherein, when the assembly is switched from the capped state to the uncapped state, the third sloped region guides the movement of the outer member after the second sloped region,
- wherein the first sloped region, the second sloped region, and the third sloped region are configured such that, when the third sloped region guides the movement and the outer member is rotated by the angle, the outer member is displaced axially away from the housing by a third distance, and wherein the second distance is smaller than the third distance.

19. A method for dispensing a drug with the drug delivery device according to claim 15.

\* \* \* \* \*